US009058343B2

(12) United States Patent
Cohen et al.

(10) Patent No.: US 9,058,343 B2
(45) Date of Patent: *Jun. 16, 2015

(54) BACKWARD COMPATIBILITY IN DATABASE SCHEMAS

(71) Applicant: eBay Inc., San Jose, CA (US)

(72) Inventors: Alon Cohen, San Jose, CA (US); Bhaven Avalani, Cupertino, CA (US); Zahid N. Ahmed, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/051,750

(22) Filed: Oct. 11, 2013

(65) Prior Publication Data
US 2014/0040321 A1 Feb. 6, 2014

Related U.S. Application Data

(63) Continuation of application No. 12/907,524, filed on Oct. 19, 2010, now Pat. No. 8,606,824, which is a continuation of application No. 11/074,541, filed on Mar. 8, 2005, now Pat. No. 7,844,639, and a (Continued)

(51) Int. Cl.
G06F 17/30 (2006.01)
G06Q 30/08 (2012.01)
H04L 29/08 (2006.01)

(52) U.S. Cl.
CPC .... *G06F 17/30292* (2013.01); *G06F 17/30297* (2013.01); *G06Q 30/08* (2013.01); *H04L 67/10* (2013.01)

(58) Field of Classification Search
CPC ............... G06F 17/30292; G06F 17/30297
USPC .......................................... 707/803, 804, 805
See application file for complete search history.

(56) References Cited

U.S. PATENT DOCUMENTS 5,668,991 A * 9/1997 Dunn et al. ........................ 1/1
5,717,924 A * 2/1998 Kawai .................................. 1/1
(Continued)

FOREIGN PATENT DOCUMENTS

WO WO-2005052759 A2 6/2005
WO WO-2005052759 A3 6/2005

OTHER PUBLICATIONS

Chaitanya Baru, XViews: XML Views of Relational Schemas, Proceedings of the Workshop on Databases and Expert System Applications, 1999, 99. 1-6, Florence, Italy.*

(Continued)

*Primary Examiner* — Sheree Brown
(74) *Attorney, Agent, or Firm* — Schwegman Lundberg & Woessner, P.A.

(57) ABSTRACT

A method of accommodating at least one difference between a first database schema and a second database schema is provided. The method includes receiving a response generated by a first application program using a first database schema, identifying a value in the response that is unrecognizable to a second application program using a second database schema and substituting, using a processor, the value that is unrecognizable to the second application program with a reserved element recognizable to the second application program, the reserved element indicating to the second application program that a portion of the response is not recognizable to the second application program. The method further includes communicating the response to the second application program.

20 Claims, 16 Drawing Sheets

Related U.S. Application Data continuation-in-part of application No. 10/997,767, filed on Nov. 24, 2004, now Pat. No. 7,818,759.

(60) Provisional application No. 60/524,782, filed on Nov. 24, 2003, provisional application No. 60/559,204, filed on Apr. 1, 2004.

(56) References Cited

U.S. PATENT DOCUMENTS

| | | | | |
|---|---|---|---|---|
| 5,826,030 | A | | 10/1998 | Hebert |
| 5,926,636 | A | | 7/1999 | Lam et al. |
| 5,937,409 | A | * | 8/1999 | Wetherbee ............................ 1/1 |
| 6,061,515 | A | * | 5/2000 | Chang et al. .................. 717/114 |
| 6,076,090 | A | * | 6/2000 | Burroughs et al. ............ 707/792 |
| 6,119,130 | A | * | 9/2000 | Nguyen et al. ................. 707/695 |
| 6,324,693 | B1 | * | 11/2001 | Brodersen et al. ............ 717/177 |
| 6,370,566 | B2 | * | 4/2002 | Discolo et al. ................ 709/206 |
| 6,569,207 | B1 | * | 5/2003 | Sundaresan ................... 715/234 |
| 6,631,519 | B1 | * | 10/2003 | Nicholson et al. ............ 717/169 |
| 6,722,180 | B2 | * | 4/2004 | Weschler .......................... 72/457 |
| 6,772,180 | B1 | * | 8/2004 | Li et al. .......................... 715/229 |
| 6,779,184 | B1 | * | 8/2004 | Puri et al. ....................... 719/315 |
| 6,842,904 | B1 | | 1/2005 | Bartz et al. |
| 6,847,974 | B2 | * | 1/2005 | Wachtel ......................... 717/143 |
| 7,296,022 | B2 | * | 11/2007 | Harjanto ............................... 1/1 |
| 7,403,956 | B2 | * | 7/2008 | Vaschillo et al. ............. 707/770 |
| 7,818,759 | B2 | | 10/2010 | Ahmed et al. |
| 7,844,639 | B2 | | 11/2010 | Cohen et al. |
| 7,886,305 | B2 | | 2/2011 | Ahmed et al. |
| 8,121,978 | B2 | | 2/2012 | Wiss et al. |
| 8,352,968 | B2 | | 1/2013 | Ahmed et al. |
| 2002/0078094 | A1 | * | 6/2002 | Krishnaprasad et al. ..... 707/513 |
| 2003/0055828 | A1 | * | 3/2003 | Koch et al. ....................... 707/10 |
| 2003/0110176 | A1 | * | 6/2003 | Morgan et al. ................ 707/100 |
| 2003/0191757 | A1 | * | 10/2003 | Ambrosini et al. ................ 707/3 |
| 2004/0010791 | A1 | * | 1/2004 | Jain et al. ....................... 719/318 |
| 2004/0015783 | A1 | | 1/2004 | Lennon et al. |
| 2004/0044959 | A1 | * | 3/2004 | Shanmugasundaram et al. ............ 715/513 |
| 2004/0075857 | A1 | | 4/2004 | Akiyoshi et al. |
| 2004/0103098 | A1 | * | 5/2004 | Mitra ............................... 707/10 |
| 2004/0216147 | A1 | * | 10/2004 | Yanosy et al. ................. 719/328 |
| 2005/0015439 | A1 | * | 1/2005 | Balaji et al. ................... 709/203 |
| 2005/0050056 | A1 | * | 3/2005 | Idicula et al. ................. 707/100 |
| 2005/0138648 | A1 | * | 6/2005 | Ahmed et al. ................. 719/328 |
| 2005/0149543 | A1 | | 7/2005 | Cohen et al. |
| 2010/0223633 | A1 | | 9/2010 | Ahmed et al. |
| 2013/0125147 | A1 | | 5/2013 | Ahmed et al. |

OTHER PUBLICATIONS

"U.S. Appl. No. 10/997,767, Advisory Action mailed Apr. 23, 2009", 3 pgs.

"U.S. Appl. No. 10/997,767, Final Office Action mailed Feb. 4, 2009", 8 pgs.

"U.S. Appl. No. 10/997,767, Non Final Office Action mailed Feb. 22, 2008", 9 pgs.

"U.S. Appl. No. 10/997,767, Non-Final Action mailed Jul. 6, 2009", 13 pgs.

"U.S. Appl. No. 10/997,767, Notice of Allowance mailed Jan. 22, 2010", 13 pgs.

"U.S. Appl. No. 10/997,767, Notice of Allowance mailed May 17, 2010", 9 pgs.

"U.S. Appl. No. 10/997,767, Response filed Apr. 6, 2009 to Final Office Action mailed Feb. 4, 2009", 3 pgs.

"U.S. Appl. No. 10/997,767, Response filed Jul. 22, 2008 to Non Final Office Action mailed Feb. 22, 2008", 10 pgs.

"U.S. Appl. No. 10/997,767, Response filed Nov. 6, 2009 to Non Final Office Action mailed Jul. 6, 2009", 11 pgs.

"U.S. Appl. No. 11/074,541, Advisory Action mailed Jan. 25, 2008", 3 pgs.

"U.S. Appl. No. 11/074,541, Advisory Action mailed Apr. 7, 2009", 3 pgs.

"U.S. Appl. No. 11/074,541, Examiner Interview Summary mailed May 19, 2010", 3 pgs.

"U.S. Appl. No. 11/074,541, Final Office Action mailed Jan. 26, 2009", 16 pgs.

"U.S. Appl. No. 11/074,541, Final Office Action mailed Mar. 1, 2010", 13 pgs.

"U.S. Appl. No. 11/074,541, Final Office Action mailed Nov. 1, 2007", 22 pgs.

"U.S. Appl. No. 11/074,541, Non Final Office Action mailed May 18, 2007", 22 pgs.

"U.S. Appl. No. 11/074,541, Non Final Office Action mailed Jul. 1, 2008", 16 pgs.

"U.S. Appl. No. 11/074,541, Non Final Office Action mailed Jul. 21, 2009", 18 pgs.

"U.S. Appl. No. 11/074,541, Notice of Allowance mailed Jul. 21, 2010", 19 pgs.

"U.S. Appl. No. 11/074,541, Response filed Jan. 2, 2008 to Final Office Action mailed Nov. 1, 2007", 24 pgs.

"U.S. Appl. No. 11/074,541, Response filed Mar. 26, 2009 to Final Office Action mailed Jan. 26, 2009", 11 pgs.

"U.S. Appl. No. 11/074,541, Response filed May 18, 2010 to Final Office Action mailed Mar. 1, 2010", 12 pgs.

"U.S. Appl. No. 11/074,541, Response filed Aug. 16, 2007 to Non Final Office Action mailed May 18, 2007", 22 pgs.

"U.S. Appl. No. 11/074,541, Response filed Nov. 3, 2008 to Non Final Office Action mailed Jul. 1, 2008", 17 pgs.

"U.S. Appl. No. 11/074,541, Response filed Nov. 23, 2009 to Non Final Office Action mailed Jul. 21, 2009", 12 pgs.

"U.S. Appl. No. 12/771,981 Supplemental Notice of Allowability Mailed Oct. 19, 2010", 12.

"U.S. Appl. No. 12/771,981, Notice of Allowance mailed Sep. 29, 2010", 14 pgs.

"U.S. Appl. No. 12/907,524, Advisory Action mailed Sep. 13, 2012", 2 pgs.

"U.S. Appl. No. 12/907,524, Examiner Interview Summary mailed Apr. 8, 2013", 3 pgs.

"U.S. Appl. No. 12/907,524, Final Office Action mailed Jul. 2, 2012", 10 pgs.

"U.S. Appl. No. 12/907,524, Non Final Office Action mailed Jan. 2, 2013", 11 pgs.

"U.S. Appl. No. 12/907,524, Non Final Office Action mailed Feb. 28, 2012", 9 pgs.

"U.S. Appl. No. 12/907,524, Notice of Allowance mailed Apr. 10, 2013", 9 pgs.

"U.S. Appl. No. 12/907,524, Notice of Allowance mailed Aug. 6, 2013", 9 pgs.

"U.S. Appl. No. 12/907,524, Response filed Apr. 2, 2013 to Non Final Office Action mailed Jan. 2, 2013", 8 pgs.

"U.S. Appl. No. 12/907,524, Response filed Apr. 23, 2012 to Non Final Office Action mailed Feb. 28, 2012", 10 pgs.

"U.S. Appl. No. 12/907,524, Response filed Sep. 4, 2012 sto Final Office Action mailed Jul. 2, 2012", 12 pgs.

"U.S. Appl. No. 12/907,524, Response filed Sep. 26, 2012 to Advisory Action mailed Sep. 13, 2012", 13 pgs.

"U.S. Appl. No. 12/984,461, Non Final Office Action mailed Apr. 19, 2012", 9 pgs.

"U.S. Appl. No. 12/984,461, Notice of Allowance mailed Sep. 7, 2012", 7 pgs.

"U.S. Appl. No. 12/984,461, Response filed Aug. 20, 2012 to Non Final Office Action mailed Apr. 19, 2012", 9 pgs.

"Web Service Description Language(WSDL) Version 1.2 Part3: Bindings, W3C Working Draft:", [Online]. Retrieved from the Internet: <URL: http://www.w3.org/TR/2003/WD-wsdl12-bindings-20030611>, (Jun. 11, 2003), 38 pgs.

Erik, D. "Norwegian University of Science and Technology". Improved Backward Compatibility and API Stability with Advanced Continuous Integration, (Jun. 2007). 90 pgs.

* cited by examiner

BACKWARD COMPATIBILITY IN DATABASE SCHEMAS

RELATED APPLICATIONS

The present application is a continuation of U.S. patent application Ser. No. 12/907,524, filed Oct. 19, 2010, which is a continuation of U.S. patent application Ser. No. 11/074,541, filed Mar. 8, 2005, which claims the benefit of priority under 35 U.S.C. §119(e) to U.S. Provisional Patent Application No. 60/559,204, filed Apr. 1, 2004 and is a Continuation-in-Part of U.S. patent application Ser. No. 10/997,767, filed Nov. 24, 2004, which claims the benefit of priority under 35 U.S.C. §119(e) to U.S. Provisional Patent Application No. 60/524,782, filed Nov. 24, 2003, all of which are incorporated herein by reference in their entirety.

FIELD OF THE INVENTION

The present application relates generally to the technical field of database schemas and application program interfaces using such schemas.

BACKGROUND

Buyers, sellers, and other business partners, are increasingly utilizing electronic trading systems (e.g., electronic marketplaces) to collaborate and to do business with each other. Part of this collaboration may involve, for example, linking operational business processes. Business processes may be linked by the exchange of information, in agreed sequences and within agreed timeframes, between buyer and seller applications, and affiliated third-party business service providers.

To facilitate the above-mentioned exchange of business information, buyer and seller applications, as well as applications of third-party business service providers, may expose Application Program Interfaces (APIs) which allow applications to make calls (e.g., function calls) to other applications to either request or send information. However, as the number of buyers, sellers, and third-party applications participating in the exchange of business information increases, the technical challenge of enabling this multitude of applications to exchange information increases. For example, the development of applications that are able to access APIs of a large number of other applications becomes increasingly burdensome and technically challenging. Further, data schemas or definitions provided by a network-based commerce facility to a third-party may however become outdated when changes occur with a master data schema at a network-based commerce facility. When changes occur with the master data schema, functional problems may arise at the third-party application.

DETAILED DESCRIPTION

Figure 1:
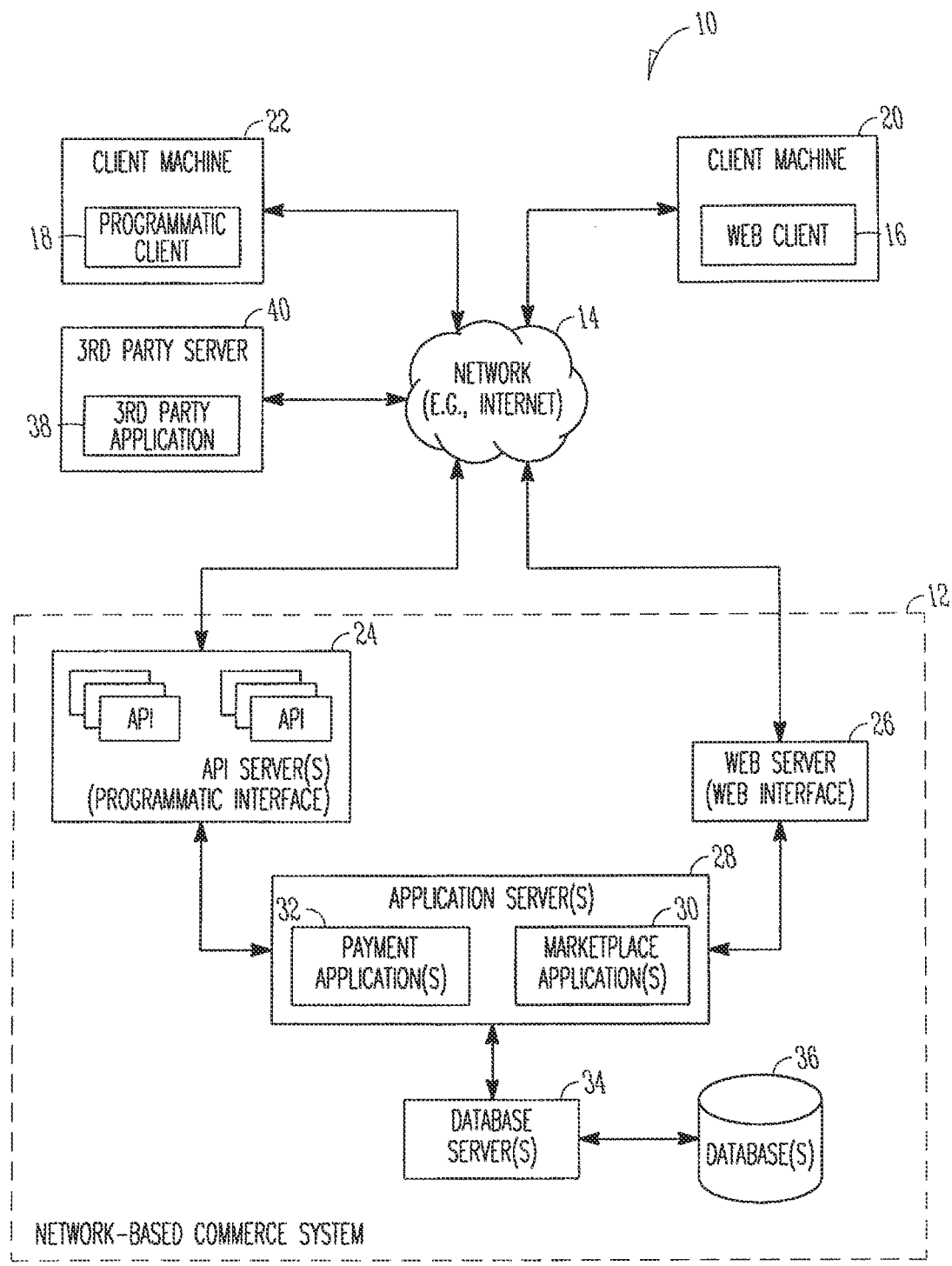
FIG. 1 is a network diagram depicting a trading system, within which an example embodiment of the present invention may be deployed, having a client-server architecture.

A system and method of accommodating at least one difference between a first database schema and a second database schema is provided. The method may include receiving a request from a first application program that is operationally dependent upon the first database schema, the request being received at a second application program that is operationally dependent upon the second database schema. The method includes identifying if there is a difference between the first database schema and the second database schema. When there is a difference, the method includes identifying the difference between the first database schema and the second database schema to identify at least one different schema definition element; associating the different schema definition element with a reserved element, the reserved element having a corresponding reserved element provided in the first database schema; and communicating a response to the first application program including the reserved element.

In the following description, for purposes of explanation, numerous specific details are set forth in order to provide a thorough understanding of the present invention. It will be evident, however, to one skilled in the art that the present invention may be practiced without these specific details.

An example embodiment of the present invention is discussed below within the context of a network-based commerce system that supports a network-based, electronic marketplace. Buyers and sellers, utilizing buyer and seller applications, as well as third-party business service providers, interact utilizing the electronic marketplace as a forum. Business processes may be driven by a wider range of electronic marketplace operational considerations, so as to enable buyers and sellers to conduct transactions utilizing the electronic marketplace. In one embodiment of the present invention, a server at the network-based commerce system transforms data into a modified format prior to communicating a response to a third-party system when the third-party system has an outdated version of the schema definitions. Accordingly, the network-based commerce system can still support third-party applications even though the schema definitions at the network-based commerce facility have changed.

In one example embodiment, message exchanges comply with a business language schema component model. The business language schema design framework allows an electronic marketplace server system (e.g., the commerce system) to support a wide range of commerce transactions, including auction, fixed price buying and selling, product catalogs searches and payments. These transactions provide examples of communications between buying and selling applications via the electronic marketplace, as well as communications with other third-party business service providers.

In an example embodiment, there is provided a schema component model that provides an abstract definition of the business message payloads. Payloads may be defined in a way to support extensibility which enables other types of commerce transactions models to be made available via the marketplace (e.g., for electronic procurement, reverse auctioning, credit check, and shipment/logistic activities).

The business language schema may catalog common business message components that may be utilized for any number of business communications facilitated by an electronic marketplace (e.g., auction, fixed price buying and selling, product catalog search, catalog-based listings, and electronic payment in support of item purchases). The business language schema, in one embodiment, enables a wide range of business applications to interoperate with XML web services APIs, and externally located and internally hosted clients.

Request/response message payload components may be defined by the business language schema which can be utilized to enable the building of a range of messages that may flow back and forth from buyers, sellers and third-party business service providers to marketplace XML web services, these web services enabling trading parties to list, find, and sell items and services.

In various example embodiments, message exchanges may be made, utilizing the business-language based message exchange model of an example embodiment of the present invention, with both external and internal business applications over synchronous communication and asynchronous communication links. Further, document-oriented synchronous messaging, as well as document-oriented asynchronous messaging, may be supported. As will be described in further detail below, a message packaging format may be a flavor of the XML messaging format (e.g., SOAP 1.1, SOAP 1.2, ebXML, or an e-mail format such as MIME or any other arbitrary message packaging format). Further, transport protocols used may include HTTP, HTTPS, SMTP, or some other arbitrary transport protocol needed for particular business applications hosted remotely at a trading entity that requires moving data.

A schema design framework for a host language in the example form of a business language is provided to support message payload definitions for a multitude of use cases and for use with a multitude of APIs. This may be accomplished via an extensibility model that includes base components, and business message components that support new transaction models and messaging components. Specifically, the base components may provide a definition of basic core component types, basic components and aggregate components, including an abstract messaging framework. The business message components are based on the business information requirements for a particular use case.

Regarding the business messaging components, based on the business information requirements of a particular use case, the definitions of the basic set of messaging components are needed for a legacy transaction model can be supported utilizing the above mentioned base components in support of business message components. In one example embodiment, the business language components for use in an electronic trading environment, such as that described below with respect to FIG. 1, may include: item, item transaction, shipping details, payment, address, user, buyer, seller and payment and transaction components.

It will be appreciated that, over the course of time, many new types of business processes may be employed by a trading community (e.g., buyers, sellers and third-party service providers) that utilize an electronic marketplace and accordingly that interface with services exposed by the electronic marketplace. Such new types of applications may exploit different types of transaction interfaces (e.g., APIs) exposed by an electronic marketplace. In one example embodiment, an abstract message payload framework is provided that can be extended for many different types of messages and over different protocols, as may be required. However, it should be appreciated that the present invention is not limited to this framework and may use any other host language.

In an example embodiment, when a commerce system receives a request from a third-party system, a response message is sent to the third-party system including instances of specific enumerated code types or placeholders (custom slots) for an element that has been added in an updated schema definition but which are not present in an outdated schema definition on the third-party system. This indicates that the API has defined new, additional enumerated codes that may not be understood and correctly processed by a client application on the third-party system. An update to the schema definition(s) may, for example, be an updated XML schema definition for the targeted API. The specific enumerated code type or "CustomCode" element (also referred to herein as a reserved element or default element) being returned in such scenarios may prevent the client application from experiencing a communication breakdown with the API, due to incremental schema changes and evolutions that may occur as part of the commerce system. It will be appreciated that the example CustomCode could be used with any host language. However, by way of example, the CustomCode is described with reference to the example business language described below. In this example, embodiment, the CustomCode is included within a payload but, in other embodiments, the CustomCode may be included in any manner within a response sent from a server system to a client system e.g., a response based on Web Services Description Language (WSDL).

Example Business Language Schema Component Concepts

Core Component Type (CCT): a core component type is, in one embodiment, a low level construct that may have no meaning on its own. A core component type has a content component and additional components (e.g., mandatory or optional) which give it a specific meaning. An example of a core component type is an "amount", where the content part is a number (e.g., 87) and another required part is a unit (e.g., a. Euro).

Basic core components: a basic core component represents, in the example embodiment, a core business concept (e.g., a unique business semantic definition). This may be accomplished by employing a core component type (CCT) or a primitive data type (e.g., XSD data types) to which some other semantically unique object (e.g., a "weight" element is an instance of the core component type CCT Measure Type).

Aggregate core components: aggregate core components, in one example embodiment, encapsulate two or more basic core components which represent higher-level business concepts (e.g., "shipping address" is an instance of Address Type). Each aggregate core component may have its own business semantic definition.

Having above provided a high level introduction, amore detailed description of an example trading system, centered around a network-based commerce system, will now be described with reference to FIGS. 1-3.

Example Platform Architecture

FIG. 1 is a network diagram depicting a trading environment 10, according to one example embodiment of the present invention, having a client-server architecture. A commerce server system, in the example form of a network-based commerce system 12, provides server-side functionality, via a network 14 (e.g., the Internet) to one or more clients. FIG. 1 illustrates, for example, a web client 16 (e.g., a browser, such as the Internet Explorer browser developed by Microsoft Corporation of Redmond, Wash. State), and a programmatic client 18 executing on respective client machines 20 and 22.

Turning specifically to the network-based commerce system 12, an Application Program Interface (API) server 24 and a web server 26 are coupled to, and provide programmatic and web interfaces respectively to, one or more application servers 28. Specifically, the API server 24 exposes multiple APIs to users of the commerce system 12. Each of these APIs supports one or more function calls to applications of the system 12. Each of these APIs may have a associated API schema definitions.

The application servers 28 host one or more marketplace applications 30 and payment applications 32. The application servers 28 are, in turn, shown to be coupled to one or more databases servers 34 that facilitate access to one or more databases 36.

The marketplace applications 30 provide a number of marketplace functions and services to users that access the commerce system 12. The payment applications 32 likewise provide a number of payment services and functions to users. The payment applications 30 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based commerce system 12, it will be appreciated that, in alternative embodiments of the present invention, the payment applications 32 may form part of a payment service that is separate and distinct from the commerce system 12.

Further, while the trading environment 10 shown in FIG. 1 employs a client-server architecture, the present invention is of course not limited to such an architecture, and could equally well find application in a distributed, or peer-to-peer, system. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by network-based commerce system 12 Inc., of San Jose, Calif.) to enable sellers to author and manage listings on the commerce system 12 in an off-line manner, and to perform batch-mode communications between the programmatic client 18 and the network-based commerce system 12. As described in more detail below, such a programmatic client may operate in conjunction with locally stored schema definitions that the programmatic client 18 has previously received from the network-based commerce system 12. In one embodiment, out of date schema definitions on the programmatic client may be accommodated by the network-based commerce system 12 without affecting the operability of the programmatic client 18.

FIG. 1 also illustrates a third-party application 38, executing on a third-party server machine 40, as having programmatic access to the network-based commerce system 12 via the programmatic interfaces provided by the API server 24. For example, the third-party application 38 may, utilizing information retrieved from the network-based commerce system 12, support one or more features or functions on a website hosted by the third-party. The third-party website may, for example, provide one or more promotional, marketplace or payment functions that are supported by the relevant applications of the network-based commerce system 12.

Example Marketplace Applications

Figure 2:
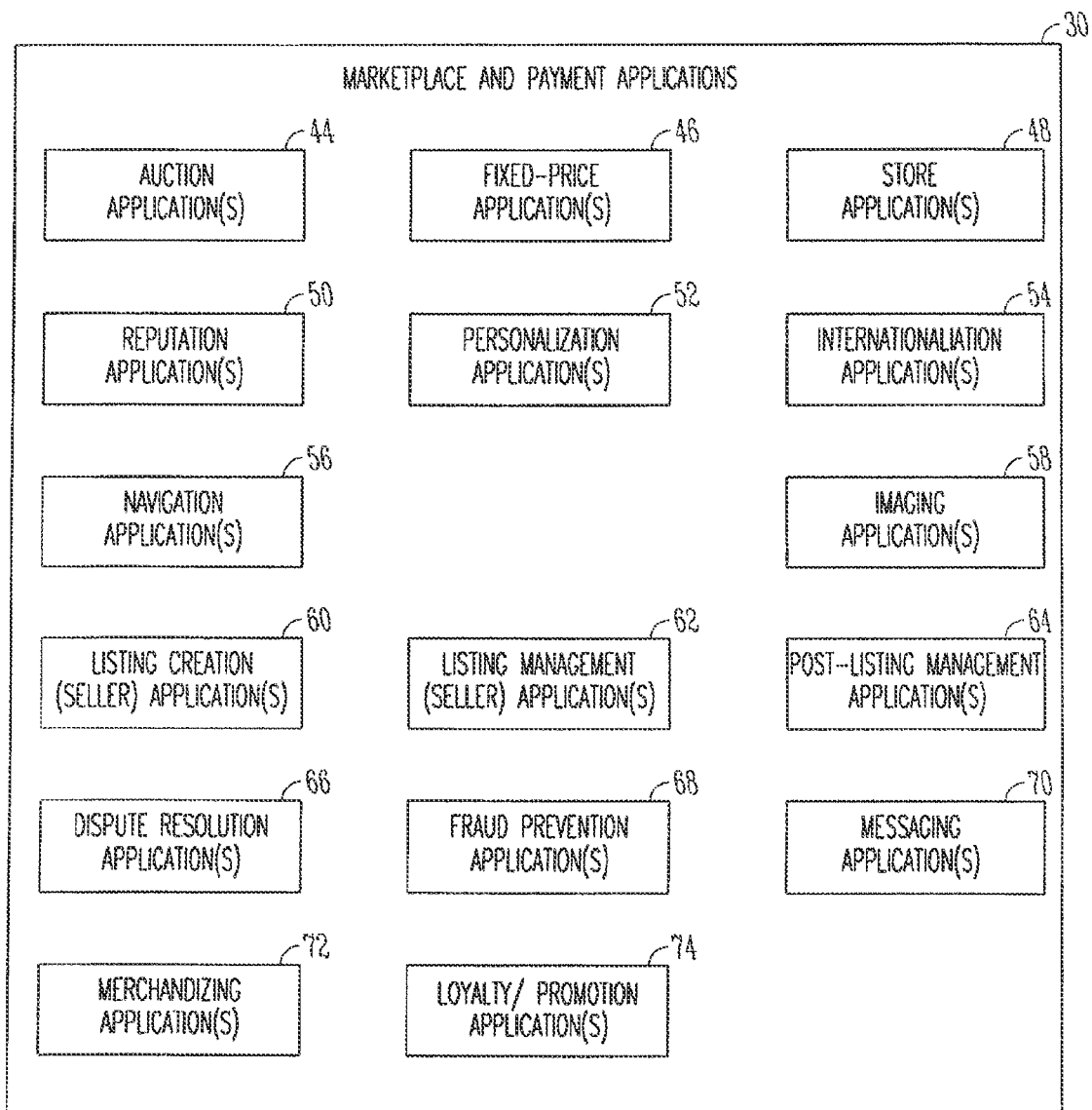
FIG. 2 is a block diagram illustrating multiple marketplace and payment applications that, in one example embodiment of the present invention, form part of a commerce server system.

FIG. 2 is a block diagram illustrating multiple marketplace and payment applications 30 that, in one example embodiment of the present invention, are provided as part of the network-based commerce system 12. The commerce system 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type Specifically, buyout-type listings (e.g., including the Buy-It-Now (BIN) technology developed by network-based commerce system 12 Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based commerce system 12 to establish, build and maintain reputations, which may be made available and published to potential trading partners. Consider that where, for example, the network-based commerce system 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based commerce system 12 over time. Other potential trading partners may then reference such a reputation for the purposes of assessing credibility and trustworthiness.

Personalization applications 52 allow users of the commerce system 12 to personalize various aspects of their interactions with the commerce system 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the commerce system 12 and other parties.

In one embodiment, the network-based commerce system 12 may support a number of marketplaces that are customized, for example, for specific geographic regions. A version of the commerce system 12 may be customized for the United Kingdom, whereas another version of the commerce system 12 may be customized for the United States. Each of these versions may operate as an independent marketplace, or may be customized (or internationalized) presentations of a common underlying marketplace.

Navigation of the network based-commerce system 12 may be facilitated by one or more navigation applications 56. For example, a search application enables key word searches of listings published via the commerce system 12. A browse application allows users to browse various category, catalogue, or inventory data structures according to which listings may be classified within the commerce system 12. Various other navigation applications may be provided to supplement the search and browsing applications.

In order to make listings, available via the network-based commerce system 12, as visually informing and attractive as possible, the marketplace applications 30 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers conveniently to author listings pertaining to goods or services that they wish to transact via the commerce system 12, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third-party mediator or arbitrator.

A number of fraud prevention applications 68 implement various fraud detection and prevention mechanisms to reduce the occurrence of fraud within the commerce system 12.

Messaging applications 70 are responsible for the generation and delivery of messages to users of the network-based commerce system 12, such messages for example advising users regarding the status of listings at the commerce system 12 (e.g., providing "outbid" notices to bidders during an auction process or to provide promotional and merchandising information to users).

Merchandising applications 72 support various merchandising functions that are made available to sellers to enable sellers to increase sales via the commerce system 12. The merchandising applications 80 also operate the various merchandising features that may be invoked by sellers, and may monitor and track the success of merchandising strategies employed by sellers.

The network-based commerce system 12 itself, or one or more parties that transact via the commerce system 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Data Structures

Figure 3:
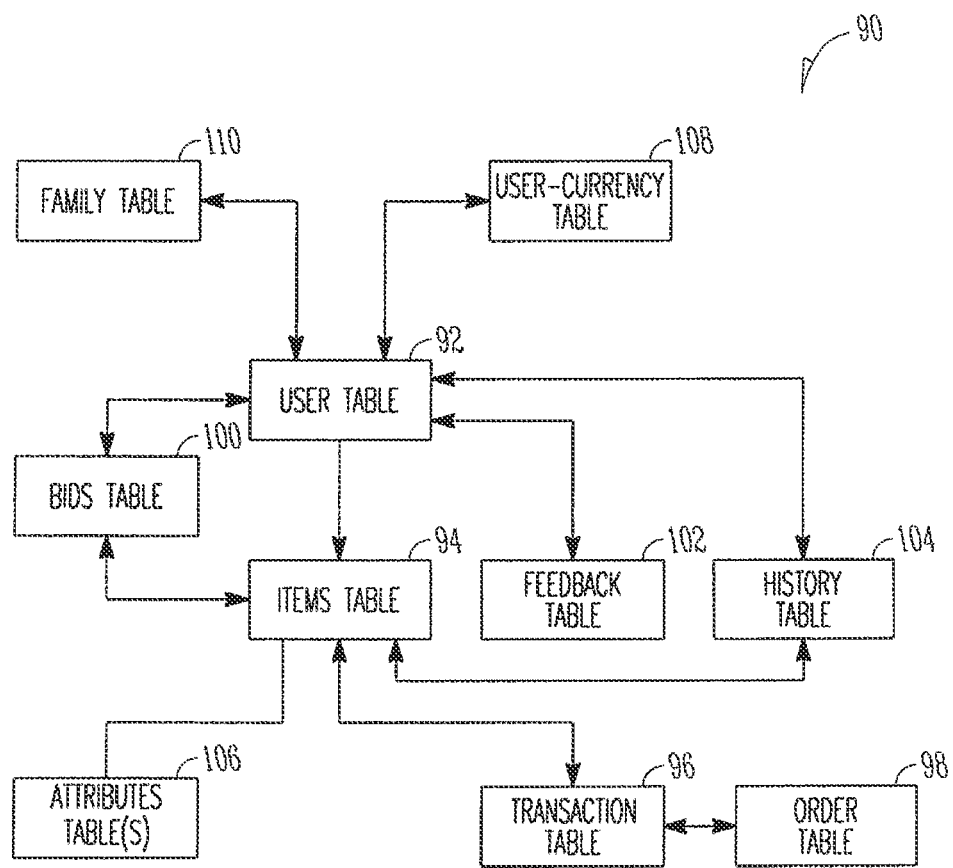
FIG. 3 is a high-level entity-relationship diagram illustrating various tables that may be maintained within databases utilized by the marketplace and payment applications described with reference to FIG. 2.

FIG. 3 is a high-level entity-relationship diagram, illustrating various tables 90 that may be maintained within the databases 36, and that are utilized by and support the marketplace and payment applications 30 and 32. A user table 92 contains a record for each registered user of the network-based commerce system 12, and may include identifier, address and financial instrument information pertaining to each such registered user. A user may, it will be appreciated, operate as a seller, a buyer, or both, within the network-based commerce system 12. In one example embodiment of the present invention, a buyer may be a user that has accumulated value (e.g., commercial or proprietary currency), and is then able to exchange the accumulated value for items that are offered for sale by the network-based commerce system 12.

The tables 90 also include an items table 94 in which are maintained item records for goods and services that are available to be, or have been, transacted via the commerce system 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transactions table 96.

Bid records within a bids table 100 each relate to a bid received at the network-based commerce system 12 in connection with an auction-format listing supported by an auction application 44. A feedback table 102 is utilized by one or more reputation applications 50, in one example embodiment, to construct and maintain reputation information concerning users. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, the currency attribute identifying the currency of a price for the relevant item as specified in by a seller.

Figure 4:
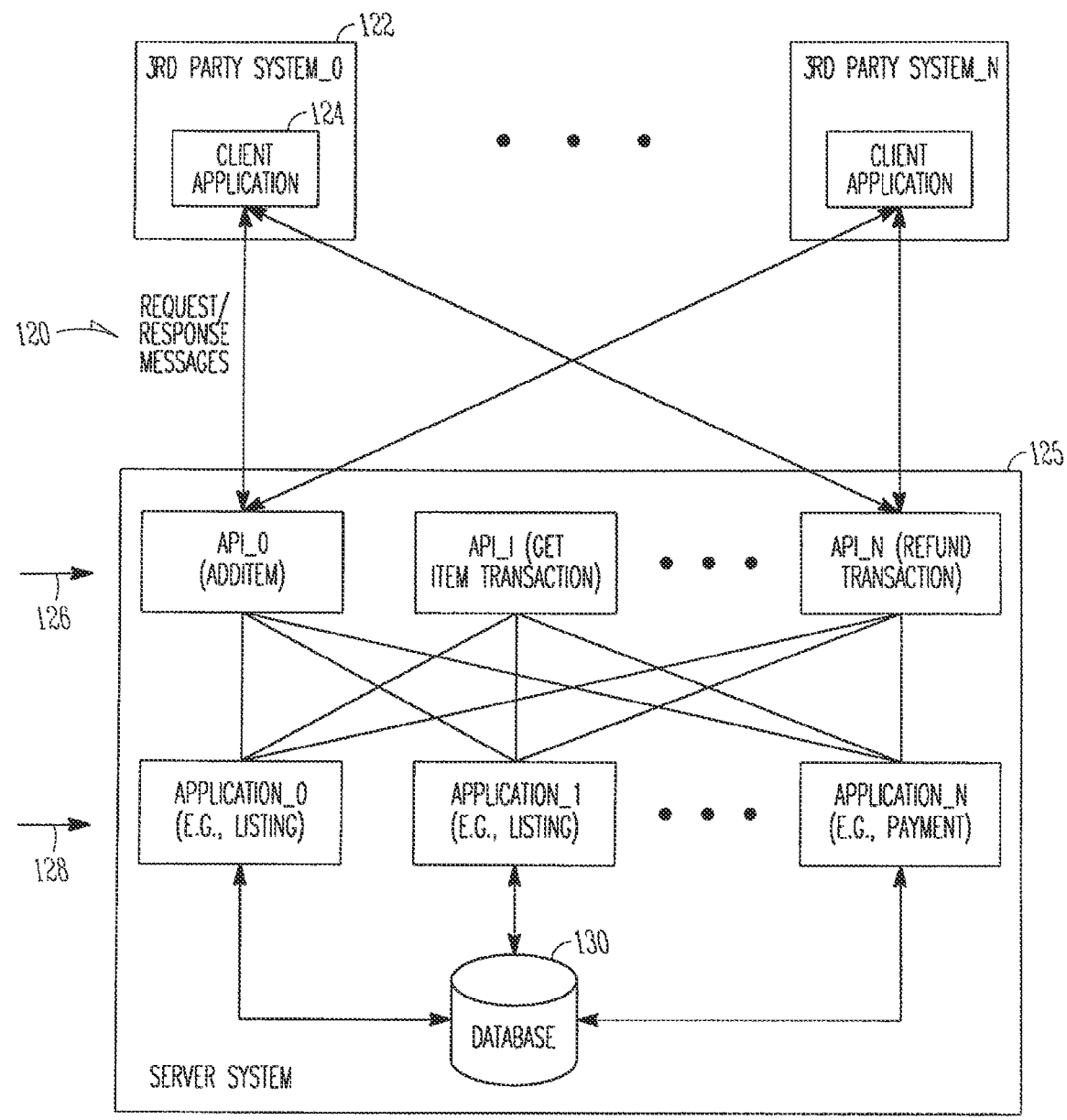
FIG. 4 is a block diagram illustrating further details regarding an example trading system, configured according to one of embodiment of the present invention.

Having above described an example trading environment 10, within which an example embodiment of the present invention maybe deployed, further details regarding a method and system to accommodate different or outdated schema definitions, according to an example embodiment of the present invention, (e.g., for message exchanges within the trading environment 10) are now described. FIG. 4 is block diagram illustrating a client-server architecture that may be deployed, for example, as part of the trading environment 10 described above with reference to FIG. 1. Reaming specifically to FIG. 4, request/response messages 120 may be sent between one of N third-party systems, such as third-party system 122, and a server system 125 that is accessed via a number of APIs exposed by respective API servers 24.

Thus, in broad terms, the third-party system 122, using the client application 124, compiles a request message, which is directed to an API 126 (e.g., AddItem, GetItemTransaction, etc.) of the server system 125. Each API 126 in turn provides access through supported function calls to one of a plurality of applications, indicated generally by arrow 128, that have access to a database 130.

Figure 5:
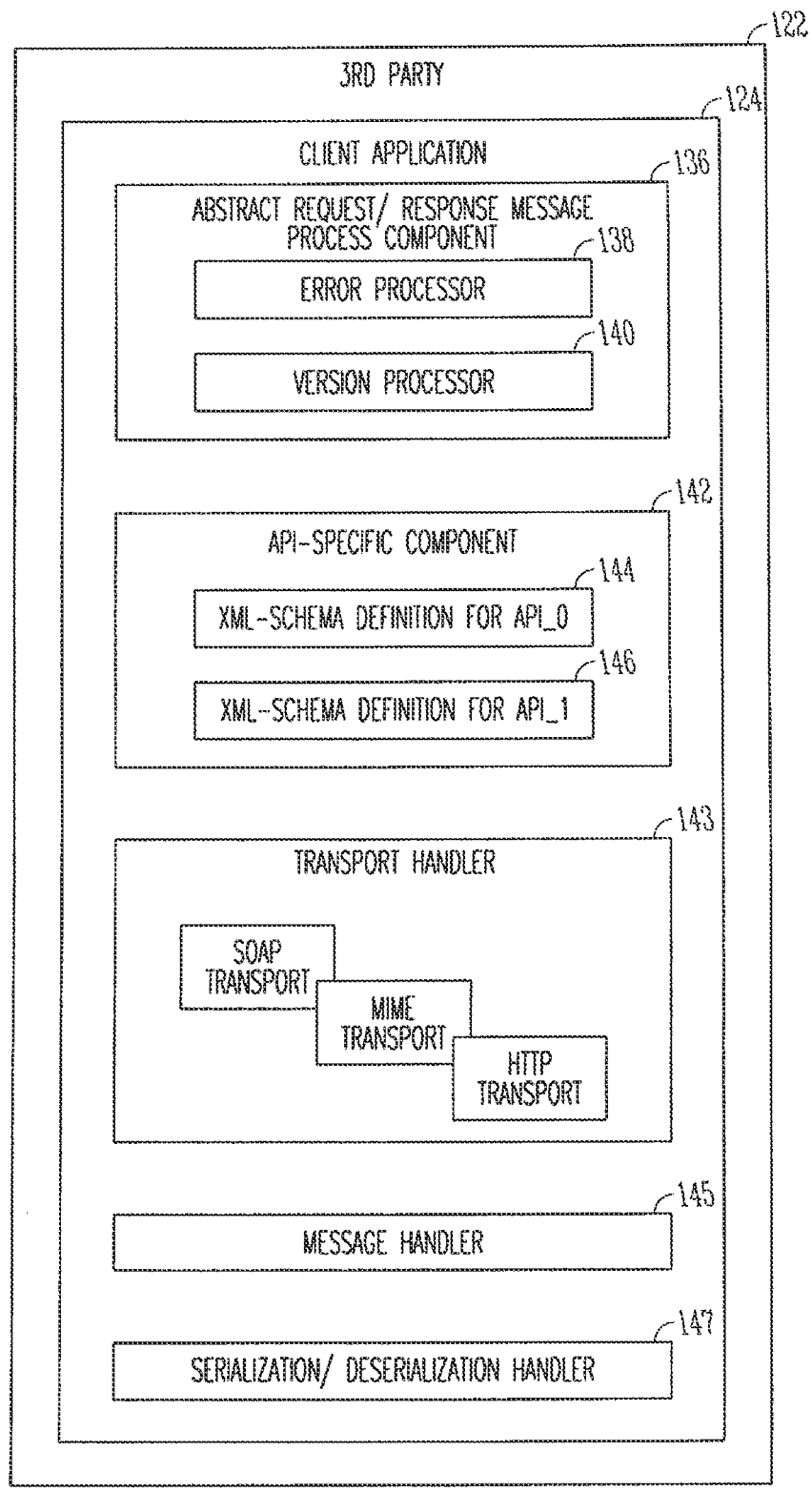
FIG. 5 is a block diagram illustrating the architecture of an example third-party application, configured according to one embodiment of the present invention, to communicate with a commerce server system that exposes a number of APIs.

Turning now to FIG. 5, further details regarding the example client application 124, hosted on a third-party system 122, are shown. The client application 124 includes a request/response message (e.g., an abstract request/response message) process component 136 for processing the request/response messages 120 shown in FIG. 4. In particular, the example abstract request/response message process component 136 comprises an Error Processor 138 and a Version Processor 140. The client application 134 further comprises an API-specific component 142 that includes XML schema definitions 144, 146 for the various API's 126 with which the client application 124 is configured to communicate (e.g., API_0 and API_1 shown in FIG. 4). A number of possible front end transport technologies, such as SOAP, MIME and HTTP, are shown to be supported by a transport handler 13. Over time the XML schema definitions 144, 146 may no longer be identical to those provided at the server system 125 due to updates/modifications that may take place to schema definitions at the server system 125. For example, new operations and/or data elements may be added to the schema definition(s). However, as described in more detail below, such variations between the client-side and server-side schema definitions may be accommodated so that the client-side components (e.g., API-specific component 142) are still be operable.

The client application 124 is also shown by way of example to include a message handler 145, and a serialization/deserialization handler 147, in addition to the API specific component 142. Specifically, each third-party system 122 may host a client application 124, which can exploit the abstract request/response message via any one of the following processing components:

i) A transport handler 143 which supports the communication protocol e.g., HTTP, HTTPS, SMTP, etc;
ii) A message handler 145 which supports the message envelope processing capabilities. e.g., HTTP, POST Raw Data stream, SOAP, MIME, etc.;
iii) Abstract request serialization and response deserialization handler 147; and
iv) Client-side API specific components 142.

The transport handler 143 and the message handler can be formed from any standard, commercially available Software Development Kit (SDK) to which a third-party has access in its development and runtime deployment environments.

The abstract request serialization and response deserialization handler 137 can be developed for client applications 124 once, and reused multiple times, thus reducing the cost of interfacing and also providing consistent interfacing with API-based application services exposed by the commerce system 12 over a wide range of transport and messaging particles. Such a "write once and, use multiple times" deployment is useful for trading communities, regardless of use case and other infrastructure components in support of transport, security and messaging protocols.

Figure 6:
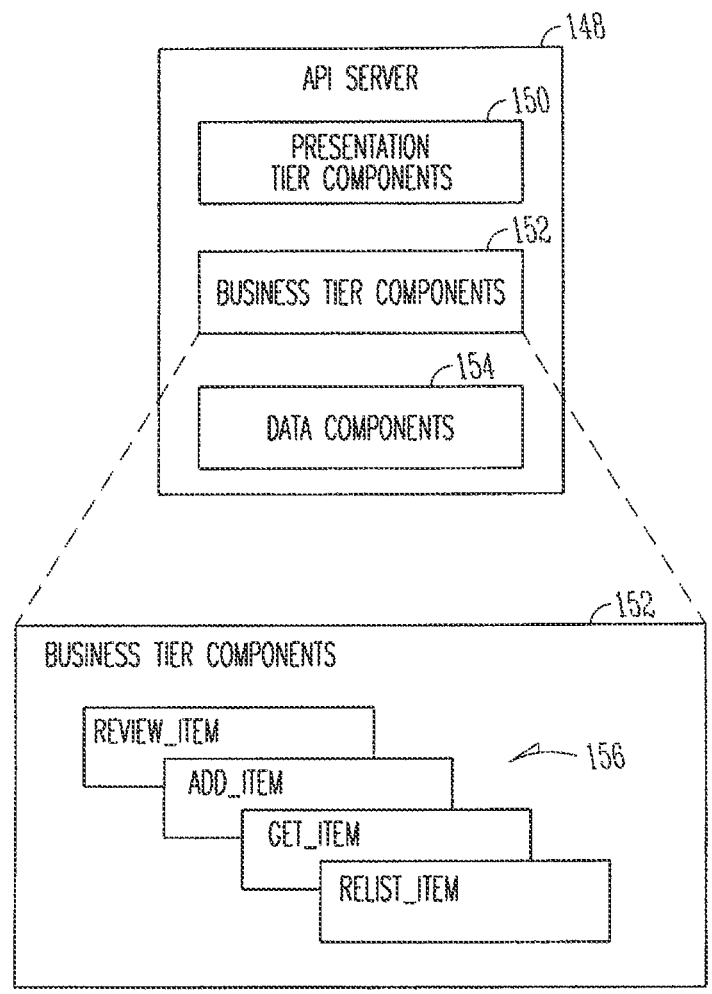
FIG. 6 is a block diagram illustrating the architecture of an API server, according to an example embodiment of the present invention.

Turning now to FIG. 6, at the server side, an example API Server 148 comprises a front end Presentation tier 150, which receives request messages and sends response messages, a Business tier 152 and a Data components tier 154. The Business tier 152 includes components corresponding to the various APIs, indicated generally by arrow 156.

Figure 7:
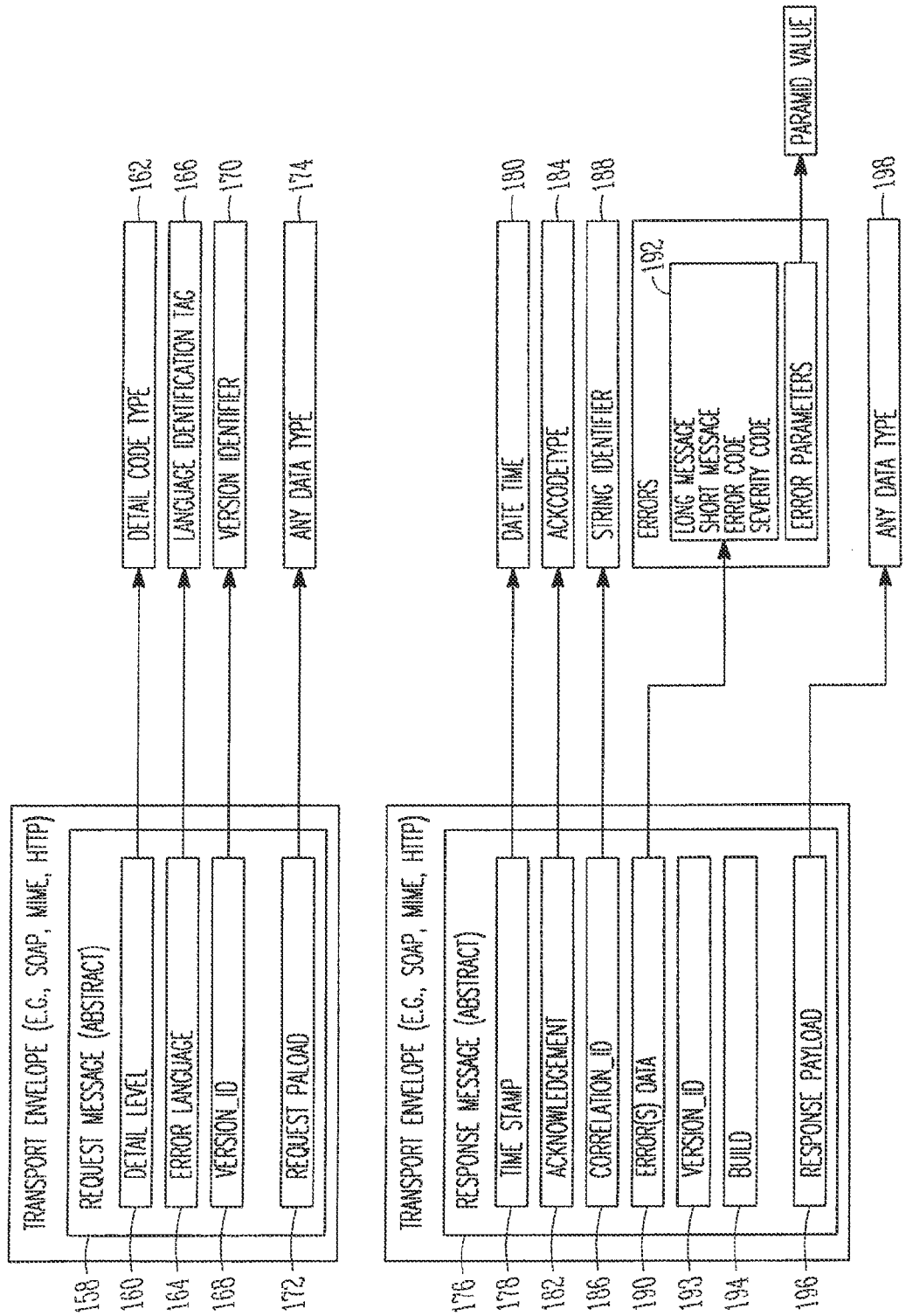
FIG. 7 is a block diagram illustrating structural details of example request and response messages.

The structure of example abstract request and response messages 158, 176 will now be described in detail with reference to FIG. 7. Referring first to the abstract request message 158, an example abstract request message 158 comprises a Detail Level component 160 and an associated DetailCodeType 162. This advantageously allows the client application 124 to request a required level of detail within a listing, for example, relating to a particular item listed on the commerce system 12. The level of detail requested may range from a most detailed to a least detailed level. The abstract request message 158 further comprises an Error Language component 164 and an associated Language Identification Tag 166, and a Version_ID component 168 and an associated Version Identifier 170. The abstract request message 158 is then completed by providing a Request Payload component 172, for carrying any type of XML data 174.

An example abstract response message 176 includes a Time Stamp component 178 and an associated DateTime 180, and an Acknowledgement component 182 and an associated AckCodeType 184. These components are used to acknowledge receipt of a request message of the received from a client application 124.

The abstract response message 176 further includes a Correlation_ID component 186 and associated String Identifier 188, an Error(s) Data component 190 and associated data 192, a Version_ID 193, a Build component 194 and a Response Payload component 196 for receiving any type of XML data 198.

The Correlation_ID component 186 and associated String Identifier 188 allow the abstract response message 176 to be correlated with a particular incoming request message 158, and to indicate this correlation to the requesting client application 124.

Thus, in one example embodiment, there is some commonality in the abstract request and abstract response messages 158 and 176, namely they both can carry any type of data, and both include version information.

The Error Language component 164 and the Error Data(s) component 190 ensure that the API request/response messages consistently use, manage and communicate error components. Part of this is the ability to communicate versioning information identifying what version of an API a particular API server 24 is using to communicate with a client application 124 of a third-party system 122 (e.g., a client 20 and 22). Thus, for example, if a third-party system 122 sends a request message that includes incorrect data or that does not comply with the published requirements of a target API, the Error(s) Data component 190 may be used by the target API to communicate information regarding the error back to the client application 124. Thus, in an example embodiment, when an error is detected, a response message may be generated by the relevant API, this response message being either a long message or a short message, and including an error code and associated severity code. This response message is sent to the relevant client application 124, thereby informing the client application 124 as to the nature of the error.

Regarding the version of the API that the API server 24 is using, versioning information may be included in both a request message from a client application 124 to the API server 24, as well as a response message from the API server 24 back to the client application 124. This is indicated schematically by blocks 168 and 193 in FIG. 7. Thus, in an example embodiment, the respective version components in the request and response messages indicate a particular version of the API on the API server 24. In so doing, and in view of the fact that the API version used by the API server 24 typically changes, the client application 124 will have a way of detecting when it needs to upgrade the schema that it uses to format and generate request messages to the relevant. Further, in one embodiment of the invention, the server system 125 may detect from the version identification (Version_ID— see block 168) received from the client application 124 that the XML schema definitions 144, 144 are no longer current and do not correspond with the latest or current versions at the server system 125. As discussed in more detail below, the server 125 may then process or transform data from based on the current schema definition so that a response to the client application 124 does not render the client application 124 inoperable.

In one embodiment, the host language includes the example request and response message structures. The abstract request and response models can be extended to enable API requests and responses between a third-party system 122 and any number of APIs provided by one or more API servers 24. For example, a particular server system may expose a number of APIs, each conforming to the basic request/response messages described above. Thus, for example, the basic request/response messages can be extended to enable an AddItem API, or a GetItem API, or a GetAccount API. Thus, for example, for a third-party system wishing to exchange item information with the commerce system 12, the basic abstract request message may be extended with the addition of information conforming to a schema understood by a GetItem API. It will however be appreciated that the present invention is not limited to this message structure. In other words, this example arrangement allows a third-party system 122, hosting an appropriately configured client application 124, to communicate with multiple APIs with a degree of uniformity and predictability. In one embodiment, a uniform data processing model is utilized and supported by a number of APIs, thereby allowing developers of client applications to reuse parts of their code.

Dealing more specifically with the re-usability of the business language schema data components, in a specific example deployment environment of a trading environment 10 such as that illustrated in FIG. 1, schema components may be defined such that they can be reused for multiple cases of purchasing and selling items listed via the network-based commerce system 12. Examples of such reuse are provided below:

1) Listing an item utilizing an AddItem API: a client application 124 may be configured to list an item to be sold in specific regions of the world, and to recognize acceptable payment and shipment options for purchasing and shipping items in such a specific region.
2) Revising and relisting an item utilizing ReviseItem and RelistItem APIs: a client application 124 may be configured to enable the revision and relisting of existing items, such that the item properties are revised or a completely new listing for the item is created, should the item not previously have been sold.
3) Getting information about an item utilizing GetItem, GetSellerList, or GetBidderList APIs: a client application 124 may be configured to retrieve information about a particular item, or multiple items, that are actively listed via the network-based commerce system 12.

In all of the above use cases, the client application 124 is required to send information back to a network-based commerce system 112 regarding items listed for sale via the commerce system 12. This may require description of an <item> structure in a consistent manner such that the client applications 122 from which the API calls originate understand the semantics of an item listed by a setter on the e-commerce system 12. However, since the context of each call from a client application 124 is different in each use case scenario, a different degree of information needs to be provided such that some data components are included or excluded. Further, such functionality may be dependent upon the XML-schema definitions 144, 146 which, as mentioned above, may change or be updated at the server system 125.

Utilizing the item listing use case scenario described above, the issues described above can be addressed utilizing (1) an <item> data component model, and (2) multiple data validation levels.

Turning first to the <item> data component model, in terms of this model an "item" has required optional data components. These components internally also have child components that are required and optional components.

Accordingly, a single item component definition may be used for multiple API use cases, with the developers and designers of the APIs being able to select which elements of the item component must be present and which elements of an item component do not need to be present.

Turning now to the multiple data validation levels, when a client application 124 sends an API request message payload 172, an API processing payload may, in one embodiment, include the following sequence of validations:

(a) Schema Level Data Validation: the API request message payload 172 is validated with respect to an underlying schema specific to the API message payload (e.g., utilizing the XML schema definition for the item data component). Using the CustomCode of one embodiment of the present invention changes in the schema definition may be accommodated.
(b) API Specific Syntactic Data validation: This involves additional data-level validation to ensure that the client application 124 has sent required data elements that are specified in the XML schema definition to the option elements, but that are defined as required elements by the relevant API.

(c) Business Application Data Validation: This validation involves checking for a wide range of business application level validations.

The above sequence of validations, it will be noted, utilizes a single definition of key business data components such that data variability in request/response messages can be supported in a controlled manner using the required validation logic for the business use case. For example, for the following three example APIs (GetItem, GetItem Transaction and SellerList), the same definition of an <item> business definition component can be used on the client side—yet the APIs will return response messages with varying API data structures. This enables uniformity in a semantic definition, yet allows the return of different views of the <item> business component according to use case.

Accordingly, a server system (e.g., a network-based commerce system 12) that exposes multiple business application services can utilize these multiple exposed business applications in communicating with multiple client applications 122 in a way that the client applications 122 can understand and communicate. For example, information about an item with varying syntactic characteristics that correspond to an item is communicated (e.g., information about an item with varying syntactic characteristics that correspond to a data item component with a common semantic definition). The above contributes to the reusability of data components within, for example, a trading community with multiple use cases.

To develop a client application 124 that communicates with multiple APIs, or to modify an existing client application 124 to talk to multiple APIs, a developer downloads or imports XML, schema definitions for each of the multiple APIs. For example, for an example GetTransactionDetail API, the developer will need to import or download the corresponding schema for this API, and in particular the GetTransactionDetail request message as well as the GetTransactionDetail response message. Thereafter, the client application 124 will need to integrate these schema processing components with their own (e.g., as part of the API specific component 142). However, as described in more detail below, the downloaded or imported schema definitions include CustomCode or reserved elements in the schema definition to accommodate changes in the schema definitions at the server system 135.

According to an example embodiment of the present invention, and as described in more detail below, when a data schema is generated for communication to the third-party system 122, a forced or reserved element (CustomCode) is included in the schema definition. When the schema definition(s) at the server system 125 subsequently change and the schema definition(s) at the server system 125 and the third-party system are no longer identical, the forced element or CustomCode is used to replace additional elements that may have been include in the modified schema definition at the server system 125. Thus, the server system 125 uses the forced or reserved element when encountering a value that would violate the XML schema definition at the third-party system 122. Thus, in a response to a request from the third-party system 122, a default value or reserved element is provided as the enumerated code type in the response when the enumerated code type at the server system 125 will not be understood by the client application 124 using an outdated or different schema definition.

For example, after a schema definition has been communicate or published to one or more third-party systems 122, improvements, changes, modifications (including additions and/or deletions) or the like may take place at the server system 125 resulting in one or more new schema definition elements. Thus, in one month, an original XML schema definition may define 7, 10, 14 and 21 day duration values, but the next month, the updated up XML schema definition may be updated to remove the duration value of 21 days, or add a duration value of 28 days. When a further element is added to the schema definitions at the server system 125 (e.g., the addition of the 28 day value), if the API 126 at the server system 125, utilizing the current XML schema including updates, attempted to provide the 28 day duration value to the third-party system 122, the client application 124 may see this as a violation as the value is not provided in any of the schema definitions originally provided at the third-party system 122. Likewise, when the example duration value of 21 days is removed, if the client application 124, utilizing the original XML provided to the third-party system 122, attempts to provide the 21 day duration value against an updated API at the server system 125, this may be registered as a violation. To address this, a forced element or reserved element, which can carry any value, may be inserted into the request and/or response (e.g., into payload 196 of a response message 176 in one example embodiment).

In an example embodiment, an indication of a change in a schema definition element (or any other difference/change in the database schema) against the updated API of the commerce system 12 will be accepted, hut the updated API may issue a warning to the relevant client application 124 that it needs to upgrade the relevant XML schema. When, the server system 125 identifies that a version of the schema definition(s) on the third-party system 122 is outdated, it may use a forced element or CustomCode to allow backwards compatibility of the outdated schema definition(s). Thus, in an example embodiment, the default value or CustomCode is only inserted by the API server into the response message when the server detects that the client is using an outdated version of the schema definition.

Figure 8:
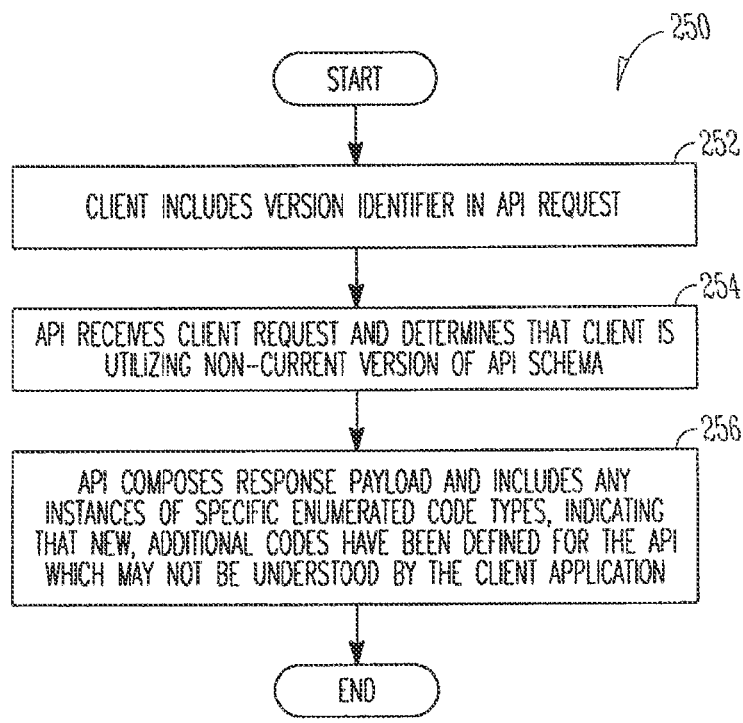
FIG. 8 is flowchart of a method, according to an example embodiment of the invention, of performing version management between a client application and an API.

FIG. 8 is a flowchart illustrating a method 250, according to an example embodiment of the present invention, of performing version management between a client application 124 and an API, for example implemented by the commerce system 12. The method 250 illustrates how the API of the commerce system 12 leverages a schema definition including reserved or forced elements to communicate back to a client application 124 with client enumerated code types in a scenario in which the client application 124 may not be synchronized with a latest version of an API adopted by the commerce server 12. For example, as shown in FIG. 5, XML-schema definitions 144, 146 may no longer fully correspond to the definitions (e.g., updated) provided at the server system 125.

The method 250 commences at block 252, with the client application 124 including its version identifier (e.g., Version_ID), identifying the version of an XML-schema definition stored by the client application 124, within a request message 158 addressed to a particular target API 126. An example of the version identifier 170 is provided below:

(Version xmlns = "URN: marketplace: APIs: BLBase Components"> 383 </Version>),

In the above example version identifier "383" may represent a particular third-party in the form of a "site code" that identifies (optionally uniquely identifies) the version of a schema definition(s) at the site. The site code may also relate to a particular international site. The version information may, however, be a date that identifies when the version was released to the third-party application 122, when the version was created at the server system 125, or any other version identification detail.

At block 254, an API 126 of the server system 125 receives a message request (e.g., the request message 158) from the client application 124, and determines from the version identifier if the client application 124 is utilizing a different and older version of an API schema or schema definitions supported by the relevant target API 126.

At block 256, the targeted API may compose a response message 176 (e.g., including a response payload 196) and include within the response message 176 instances of specific enumerated code types for an element (e.g., <Site> CustomCode </Site>) provided in an updated schema definition at the server system 125 but not at the third-party system 122. This indicates that the API has defined new, additional enumerated codes that may not be understood and correctly processed by the client application 124, in view of its updated XML schema definition for the targeted API. The "CustomCode" or forced element being returned in such scenarios will prevent the client application 124 from experiencing a communication breakdown with the API, due to incremental schema changes and evolutions that may occur as part of the commerce system 12, for example, revising API-based application service offerings.

An enumerate code type examples follow hereunder:
GetUser with Version 383 Returns SiteCode of China Example #1

API client has up-to-date version of API schema to communicate with XML Web Service APIs, e.g., GetUser API. Hence, the server system XML Web Service API returns the up-to-date enumeration code value ("China") for the <Site> enumerated code element.

```
<?xml version="1.0" encoding="utf-16"?>
<soap:Envelope xmlns:soap="htt://schemas.xmlsoap.org/vmlspap.org/envelope/"
xmlns:xsi="http://www.w3.org/2001/XMLSchema-instance"
xmlns:xsd="http://www.w3.org/2001/XMLSchema">
   <soap:Header>
      <RequesterCredentials xmlns="urn:marketplace:api:marketplaceAPI">
         <Credentials xmlns="urn: marketplace: apis: eBLBaseComponents">
            <AppId>dbeek</AppID>
            <DevId>apiteam</DevId>
            <AuthCert>apiteamcert</AuthCert>
            <Username>soapuser</Username>
            <Password>password</Password>
         </Credentials>
      </RequesterCredentials>
   </soap:Header>
   <soap:Body>
      <GetUserRequest xmlns="urn:marketplace:api:marketplaceAPI">
         <MessageID xmlns="urn:marketplace:apis:eBLBaseComponents">00cccc08-
9875-43a0-97b8-8100a586af4f</MessageID>
         <Version xmlns="urn:marketplace:apis:eBLBaseComponents">383</Version>
         <EndUserIP
<xmlns="urn:marketplace:apis:eBLBaseComponents">10.254.45.68</EndUserIP>
         <UserID>beekde_cn</UserID>
      </GetUserRequest>
   </soap:Body>
</soap:Envelope>
<?xml version="1.0" encoding="utf-16"?>
<soapenv:Envelope xmlns:soapenv"http://schemas.xmlsoap.org/soap/envelope/"
xmlns:xsd="http//www.w3.org/2001/XMLSchema"
xmlns:xsi="http://www.w3.org/2001/XMLSchema-instance">
   <soapenv:Body>
      <GetUserResponse xmlns="urn:marketplace:api:marketplaceAPI">
         <ns1:Timestamp
xmlns:ns1="urn:marketplace:apis:eBLBaseComponents">2004-11-
24T19:15:52.586Z</ns1:Timestamp>
         <ns2:Ack
xmlns:ns2="urn:marketplace:apis:eBLBaseComponents">Suceess</ns2:Ack>
         <ns3:CorrelationID
xmlns:ns3="urn:marketplace:apis:eBLBaseComponents">00cccc08-9875-43a0-
97b8-8100a586af4f              </ns3:CorrelationID>
         <ns4:Version
xmlns:ns4="urn:marketplace:apis:eBLBaseComponents">383</ns4:Version>
         <ns5:Build
xmlns:ns5="urn:marketplace:apis:eBLBaseComponents">20041119132302</ns5:
Build>
         <ns6:User xmlns:ns6="urn:marketplace:apis:eBLBaseComponents">
            <ns6:AboutMePage>false</ns6:AboutMePage>
<ns6:EIASToken>nY+sHZ2PrBmdj6wVnY+
sEZ2PrA2dj6wJkoelD5KKpgydj6x9nY+seQ==</ns6:EIASToken>
            <ns6:Email>Invalid Request</ns6:Email>
            <ns6:FeedbackScore>1</ns6:FeedbackScore>
            <ns6:FeedbackRatingStar>None</ns6:FeedbackRatingStar>
            <ns6:IDVerified>false</ns6:IDVerified>
            <ns6:NewUser>true</ns6:NewUser>
            <ns6:RegistrationDate>2004-11-10T23:14:56.000Z</ns6:RegistrationDate>
            <ns6:Site>China</ns6:Site>
            <ns6:Status>Confirmed</ns6:Status>
            <ns6:UserID>beekde_cn</ns6:UserID>
```

```
        <ns6:UserIDChanged>false</ns6:UserIDChanged>
        <ns6:UserIDLastChanged>2004-11-
10T23:14:56.000Z</ns6:UserIDLastChanged>
            <ns6:BuyerInfo/>
            <ns6:SellerInfo>
                <ns6:AllowPaymentEdit>false</ns6:AllowPaymentEdit>
                <ns6:CheckoutEnabled>true</ns6:CheckoutEnabled>
                <ns6:CIPBankAccountStored>false</ns6:CIPBankAccountStored>
                <ns6:GoodStanding>true</ns6:GoodStanding>
                <ns6:LiveAuctionAuthorized>false</ns6:LiveAuctionAuthorized>
                <ns6:MerchandizingPref>OptIn</ns6:MerchandizingPref>
                <ns6:QualifiesForB2BVAT>false</ns6:QualifiesForB2BVAT>
                <ns6:SellerGuaranteeLevel>NotEligible</ns6:SellerGuaranteeLevel>
                <ns6:SellerLevel>None</ns6:SellerLevel>
                <ns6:SchedulingInfo>
                    <ns6:MaxScheduledMinutes>30240<ns6:MaxScheduledMinutes>
                    <ns6:MinScheduledMinutes>0</ns6:MinScheduledMinutes>
                    <ns6:MaxScheduledItems>1000</ns6:MaxScheduledItems>
                </ns6:SchedulingInfo>
                <ns6:StoreOwner>false</ns6:StoreOwner>
            </ns6:SellerInfo>
        </ns6:User>
    </GetUserResponse>
</soapenv:Body>
</soapenv:Envelope>
```

Example #2

API client does not have [PLEASE CONFIRM] up-to-date version of an API schema (as specified in <Version> sub-element in GetUserRequest message below) to communicate with XML Web Service APIs: GetUser API. Hence, XML Web Service API returns in response message:

(a) the default enumeration code value ("CustomCode") for the <Site> enumerated code element; and, optionally, (b) the <Errors> sub-element also includes information to indicate to client that client's version of API schema is out of date:

```
                    <Errors>
                        <ShortMessage>Warning. Client schema out of date. <ShortMessage>
                        <LongMessage>Warning. Client schema out of date. Client Schema
Version: 361.
                        Latest Schema Version: 347. LongMessage>
                GetUser using 361 Version
                <?xml version="1.0" encoding="utf-16"?>
                <soap:Envelope xmlns:soap="http://schemas.xmlsoap.org/soap/envelope"
xmlns:xsi="http://www.w3.org/2001/XMLSchema-instance"
xmlns:xsd="http://www.w3.org/2001/XMLSchema">
                    <soap:Header>
                        <RequesterCredentials xmlns="urn:marketplace:api:marketplaceAPI">
                            <Credentials xmlns="urn:marketplace:apis:eBLBaseComponents">
                                <AppId>dbeek</AppId>
                                <DevId>apiteam</DevId>
                                <AuthCert>apiteamcert</AuthCert>
                                <Username>soapuser</Username>
                                <Password>password</Password>
                            </Credentials>
                        </RequesterCredentials>
                    </soap:Header>
                    <soap:Body>
                        <GetUserRequest xmlns="urn:marketplace:api:marketplaceAPI">
                            <MessageID xmlns="urn:marketplace:apis:eBLBaseComponents">b54b5206-
901c-43ec-865f-86497e3bab5c</MessageID>
                            <Version xmlns="urn:marketplace:apis:eBLBaseComponents">361</Version>
                            <EndUserIP
xmlns="urn:marketplace:apis:eBLBaseComponents">10.254.45.68</EndUserIP>
                            <UserID>beekde_cn</UserID>
                        </GetUserRequest>
                    </soap:Body>
                </soap:Envelope>
                <?xml version="1.0" encoding="utf-16"?>
                    <soapenv:Envelope xmlns:soapenv="http://schemas.xmlsoap.org/soap/envelope/"
xmlns:xsd="http://www.w3.org/2001/XMLSchema"
xmlns:xsi="http://www.w3.org/2001/XMLSchema-instance>
                        <soapenv.Body>
                            <GetUserResponse xmlns="urn:marketplace:api:marketplaceAPI">
                                <ns1:Timestamp
xmlns:ns1="urn:marketplace:apis:eBLBaseComponents">2004-11-
24T19:16:41.445Z</ns1:Timestamp>
```

-continued

```
    <ns2:Ack
xmlns:ns2="urn:marketplace:apis:eBLBaseComponents">Warning</ns2:Ack>
        <ns3:CorrelationID
xmlns:ns3="urn: marketplace:apis:eBLBaseComponents">b54b5206-901c-43ec-
865f-86497e3bab5c                        </ns3:CorrelationID>
        <ns4:Errors xmlns:ns4="urn:marketplace:apis:eBLBaseComponents">
            <ns4:ShortMessage>Warning. Client schema out of date.
    </ns4:ShortMessage>
            <ns4:LongMessage>Warning. Client schema out of date. Client Schema
Version: 361. marketplace Latest Schema Version: 347. </ns4:LongMessage>
            <ns4:ErrorCode>14003</ns4:ErrorCode>
            <ns4:SeverityCode>Warning</ns4:SeverityCode>
                <ns4:ErrorParameters ParamID="0">
            <ns4:Value>361</ns4:Value>
                </ns4:ErrorParameters>
                <ns4:ErrorParameters ParamID="1">
                    <ns4:Value>347</ns4:Value>
                </ns4:ErrorParameters>
        </ns4:Errors>
        <ns5:Version
xmlns:ns5="urn:marketplace:apis:eBLBaseComponents">383</ns5:Version>
            <ns6:Build
xmlns:ns6>"urn:marketplace:apis:eBLBaseComponents">20041119132302</ns6:
Build>
        <ns7:User xmlns:ns7="urn:marketplace:apis:eBLBaseComponents">
            <ns7:AboutMePage:>false</ns7:AboutMePage>
    <ns7:EIASToken>nY+sHZ2PrBmdj6wVnY+
sEZ2PrA2dj6w3koelD5KKpgydj6x9nY+seQ==</ns7:EIASToken>
            <ns7:Email>Invalid Request</ns7:Email>
            <ns7:FeedbackScore>1</ns7:FeedbackScore>
            <ns7:FeedbackRatingStar>None</ns7:FeedbackRatingStar>
            <ns7:IDVerified>false</ns7:IDVerified>
            <ns7:NewUser>true</ns7:NewUser>
            <ns7:RegistrationDate>2004-11-10T23:14:56.000Z</ns7:RegistrationDate>
            <ns7:Site>CustomCode</ns7:Site>
            <ns7:Status>Confirmed</ns7:Status>
            <ns7:UserID>beekde_cn</ns7:UserID>
            <ns7:UserIDChanged>false</ns7:UserIDChanged>
            <ns7:UserIDLastChanged>2004-11-
10T23:14:56.000Z</ns7:UserIDLastChanged>
            <ns7:BuyerInfo/>
            <ns7:SellerInfo>
                <ns:AllowPaymentEdit>false</ns7:AllowPaymentEdit>
                <ns7:CheekoutEnabled>true</ns7:CheckoutEnabled>
                <ns7:CIPBankAccountStored>false</ns7:CIPBankAccountStored>
                <ns7:GoodStanding>true</ns7:GoodStanding>
                <ns7:LiveAuctionAuthorized>false</ns7:LiveAuctionAuthorized>
                <ns7:MerchandizingPref>OptIn</ns7:MerchandizingPref>
                <ns7:QualifiesForB2BVAT>false</ns7:QualifiesForB2BVAT>
                <ns7:SellerGuaranteeLevel>NotEligible</ns7:SellerGuaranteeLevel>
                <ns7:SellerLevel>None</ns7:SellerLevel>
                <ns7:SchedulingInfo>
                    <ns7:MaxScheduledMinutes>30240</ns7:MaxScheduledMinutes>
                    <ns7:MinScheduledMinutes>0</ns7:MinScheduledMinutes>
                    <ns7:MaxScheduledItems>1000</ns7:MaxScheduledItems>
                </ns7:SchedulingInfo>
                <ns7:StoreOwner>false</ns7:StoreOwner>
            </ns7:SellerInfo>
        </ns7:User>
    </GetUserResponse>
</soapenv:Body>
</soapenv:Envelope>
```

In the example provided above the response indicates to the client application 124 that the version at the third-party 122 is out of date. However, it is to be appreciated that in an embodiment, the server system 125 may merely include the Custom-Code to accommodate one or more differences between the schema definitions at the third-party system 122 and the server system 125.

Figure 9:
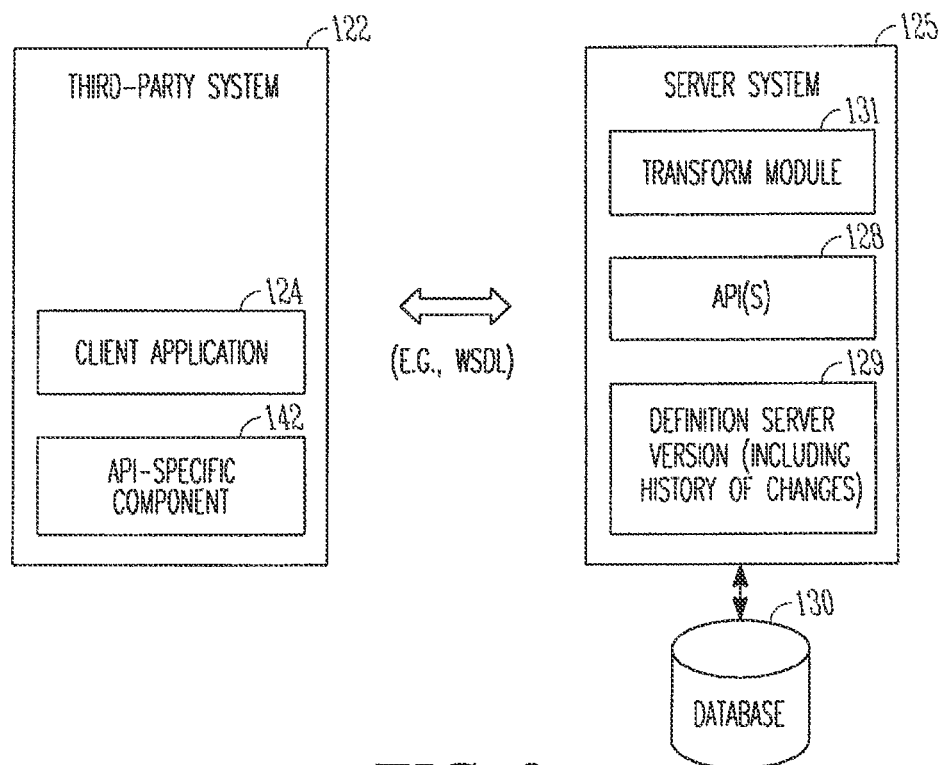
FIG. 9 is a block diagram illustrating communication between a commerce server system and a third-party system where client applications on the third-party system use schema definitions.

FIG. 9 shows an example embodiment of a system 260, in accordance with the invention, to accommodate at least one difference between a first database schema (e.g., schema definition(s)) and a second database schema (e.g., schema definition(s)). As described in more detail below, in an example embodiment, the system 260 allows a request to be received from a first application program (e.g., the client-side or client application 122) that is operationally dependent upon the first database schema (e.g., API-specific component 142). The request is received at a second application program (e.g., an APIs 126) that is operationally dependent upon the second database schema (e.g., a database schema definition associated with the API). A processing or transform module 131 (or any other module at the server system 125) may identify if there is a difference between the first database schema and the second database schema. If no difference is identified or detected, the server system may process the request in a regular fashion. However, when a difference is detected, the transform module may identify the difference between the first database schema and the second database schema to determine at least one different schema definition element. The different schema definition element (e.g., the addition of a new payment method as described by way of example below) may then associate the different schema definition element with a reserved element or CustomCode. The default element or CustomCode corresponds to a placeholder or custom slot that is included when the first database schema was originally generated. The server system 125 then communicates a response to the third-party application including the reserved element so that operation of the client application 124 is not impeded by a definition element unknown to it.

In an example embodiment of the system in FIG. 9, Web Services Description Language (WSDL) is used, WSDL is an XML format for describing network services as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate and the WSDL in may be used conjunction with SOAP 1.1, HTTP GET/POST, MIME, or the like. As can be seen in FIG. 9, the schema definition(s) at the server system 125 include updates wherein changes are documented or identifiable, and the third-party system 122 includes a schema definition 142 as originally provided to the third-party system 122 (or the last updated version of the schema definition(s) provided to the third-party system 122).

Figure 10:
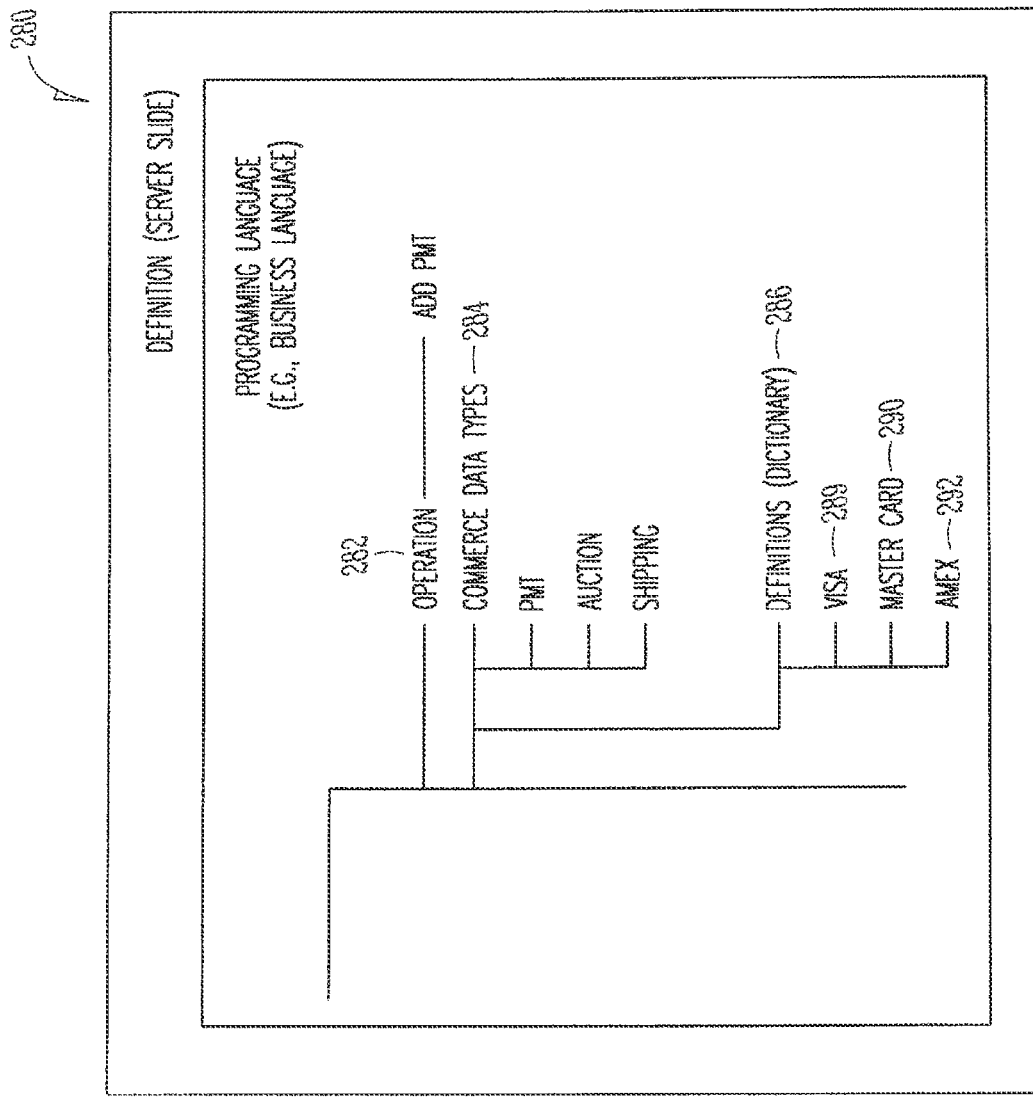
FIG. 10 shows example schema definitions of a current database schema provided at a commerce server system.
Figure 11:
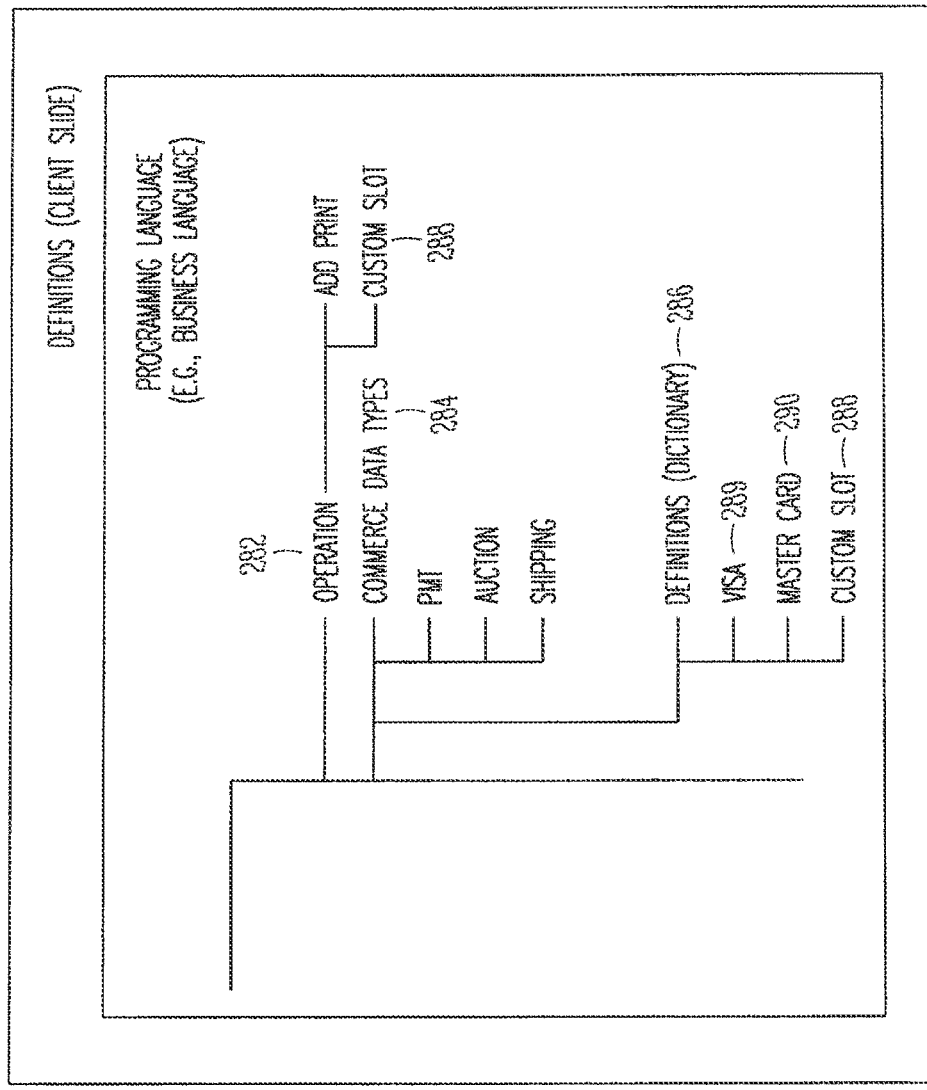
FIG. 11 shows example definitions of outdated schema definitions provided at the third-party system.

FIG. 10 shows an example schema definition at the server system 125 (e.g., stored in the dataset 130. The definition file may be operatively associated with any host programming language. In one example embodiment, the host programming language is a business language. Further, the schema definition 270 is an updated definition to that which currently resides on the third-party application. An example of the client-side schema definition 280 is shown in FIG. 11. The schema definition 280 may, for example, correspond to a XML-schema definition 144, 146 (see FIG. 5). The schema definition 280 is shown, by way of example, to include operation components 282, data types 284 and a definition 286 (defining a dictionary). It will be noted that the schema definition 270 includes corresponding operation components 282, data types 284 and definition 286. At the time of generating the schema definition for the client application 124, a custom slot or placeholder or is included in the schema definition 280 and then provided or published to one or more third-party systems 122. The custom slot 288 allows the server system 125 to modify its schema definition and yet still allow communication of responses to the third-party application 122 that the client application 124 may process despite the differences in the schema definitions. Thus, for example, in the networked-based commerce system 12, WSDL-based calls/requests made by applications to the network-based commerce system 12 using an old version of a web service may still be processed by mapping or transforming them to one or more new versions.

In order to illustrate functionality in an exemplary embodiment, assume that the network-based commerce system 12 at the time of generating the API-specific components 142 supported two payment methods shown by way of example to be Visa 288 and MasterCard 290. The definitions 286 (or dictionary generated from the definitions) that are provided at this point in time would then have definitions for these two payment methods. At this point in time, the schema definition 129 at the server system 125 would correspond with the schema definitions 142, 144, 146 provided at the third-party system 122. Any client application 124 operably dependent upon the schema definition 144, 146 would have no operability problems with responses received from the server system 125 as the schema definitions correspond. In these circumstances, enumerated values or input values which are allowed in a system would be unchanged.

However, assume that the network-based commerce system 12 adds a further payment method such as American Express or Amex 292 and, as a result thereof, a new or updated schema definition 270 is generated. The third-party system 124 may however still have the previous (old) version of the schema definition. As the server version of the schema definition 129 (see FIG. 9) is now different from the client version of the schema definition 144, 146 operability (problem may arise in prior art systems. In a similar fashion, definition elements may be removed. For example, the server system 125 may remove the Visa 288 payment method. These changes can however be accommodated by the present invention without rendering the client application 124 inoperable. As shown in FIG. 11, a custom or default slot may be created for one or more dictionary types (e.g., payment type, country, or any other definition), operation types, or data types.

Figure 13:
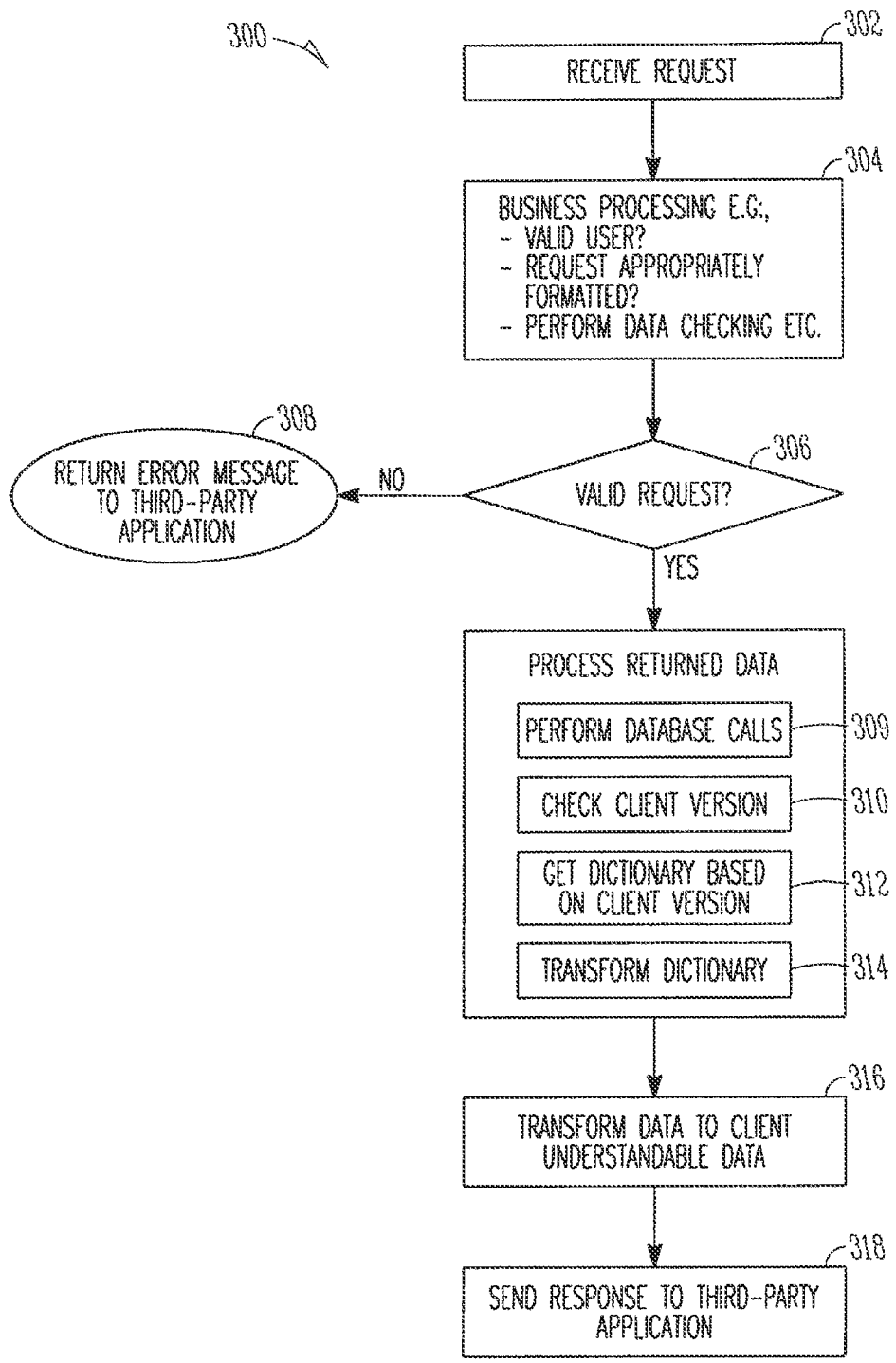
FIG. 13 shows a flowchart of an example method, in accordance with an embodiment of the invention, for processing a request from a third-party application having outdated schema definitions.

FIG. 13 shows a flowchart of an example method 300, in accordance with an embodiment of the invention, of accommodating at least one difference between a first database schema and a second database schema. The method 300 is described by way of example with reference to the trading environment 10.

As shown at block 302, one of the APIs 126 of the server system 125 receives a request from the client application 124 which identifies what version of a particular XML schema definition associated with the API 126 is resident on the third-party system 122. Thereafter, as shown at block 304 various business processing tasks may be performed. For example, checks may be performed to determine if the request came from a valid user; whether the request is appropriately formatted and other data checking procedures may be performed. If the request is not a valid request (see decision block 306), an error message may be returned to the third-party system 122 as shown at block 308.

Returning to decision block 306, if the request is a valid request, the request is then processed to determine if data requested and retrieved from a database (e.g., the database 130) needs to be transformed or changed as a result of differences between the API-specific components 142 (e.g., the schema definitions 144, 146) and the schema definition 129. In an embodiment, the relevant application 128 performs the necessary database calls required to process the request (see block 308). Thereafter, the client version of the schema definitions 144, 146 (which ever is appropriate for the selected API) is compared to the current version of the schema definitions resident at the server system 125 as shown at block 310. Definitions or a dictionary corresponding to those present at the client application 124 may be retrieved at block 312. Accordingly, differences between the current schema definition at the server system 125 and the schema definition at the third-party system 122 may be identified or determined. Thereafter, as shown at block 314, the schema definition in the current schema definition 129 is transformed to a schema definition corresponding to that at the third-party system 122. Data returned from the various database calls is transformed (see block 316) into a format corresponding to the schema definitions 144, 146 at the third-party application to provide client usable data. In one example embodiment, this involves using a CustomCode or reserved code (recognizable by the client application 122) instead of the updated definition element from the updated schema definitions 142.

Figure 12:
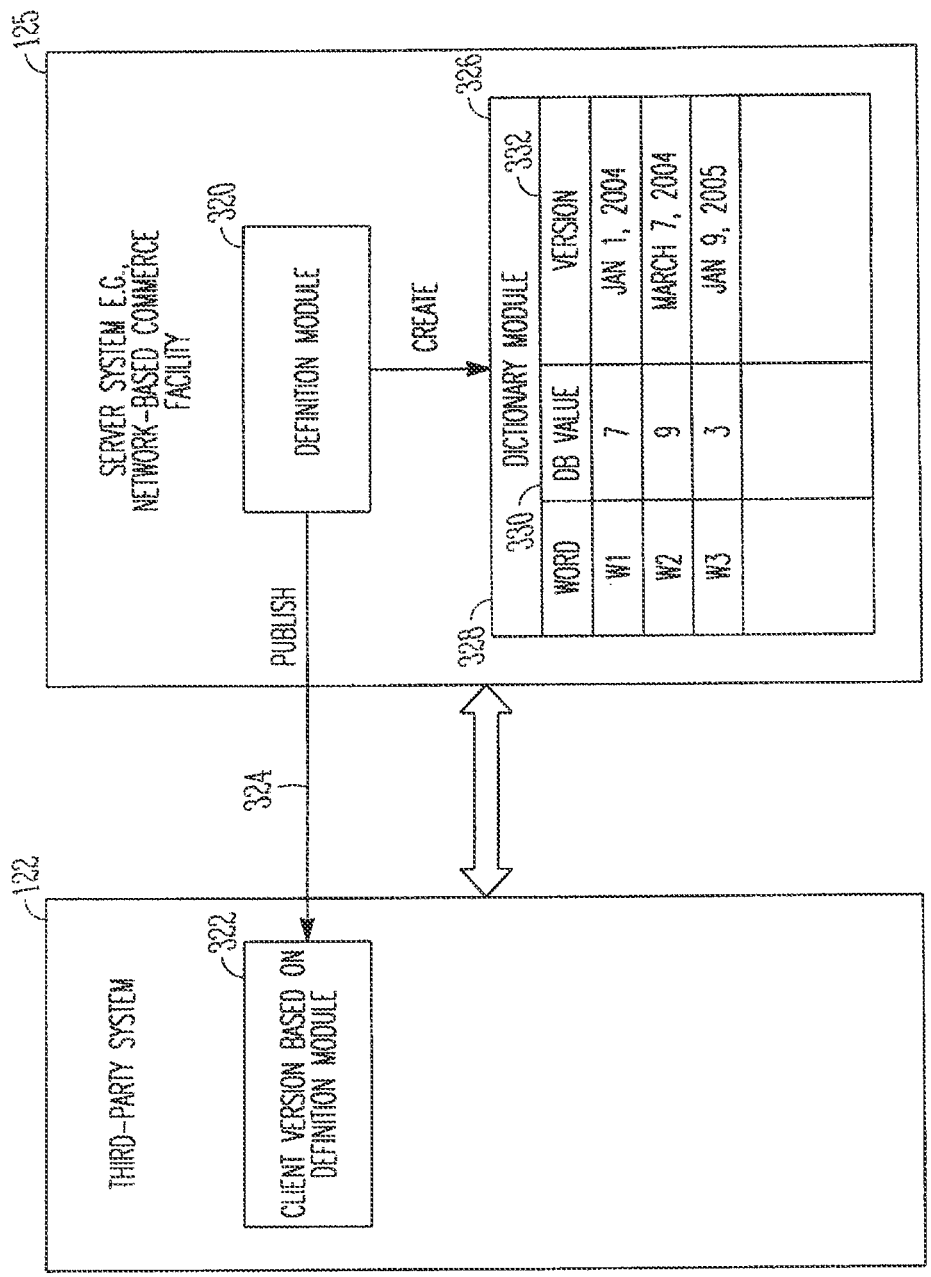
FIG. 12 shows an example dictionary module to track changes in schema definitions at a server system.

As shown by way of example in FIG. 12, a map or record may be kept at the backend of the system 125 whenever the schema definition or dictionary is changed, for example, when the new payment method Amex 292 was introduced. In the example shown the update is in the form of an addition to a dictionary 286, however, any changes to the definitions 280 may be accommodated using the CustomCode or default element technique.

FIG. 12 shows exemplary modules used by the trading environment that allow application functionality based on client-side and server-side schema definitions. The server system 125 is shown by way of example to include a definition module 320 to create a schema definition for distribution or publication to at least one third-party system 122, as shown by arrow 324. Each time the definition module 320 creates anew or updated schema definition a dictionary module table 326 is updated. It is, however, to be appreciated that the third-party system 122 may not be updated each time anew schema definition is created. For example, the networked-based commerce system 12 may have an agreement with a third-party system 122 to support communication between the server system 125 and the third-party system 122 for a given duration (e.g., a year or several of years). In these circumstances, as the third-party system 122 may be guaranteed error free interoperability with the server system 125, and a third-party may write specific client applications (e.g., the client application 124) that rely on the schema definitions 142. The specific client applications 124 may fail if responses received from the server system 125 are based on a different schema definition. In an embodiment, from the networked-based commerce systems' 12 perspective, dictionaries may be created from definition modules. The first step in creating the schema definition 270, 280 may be a definition step followed by a dictionary creation step. This may be done for each API 126. Whenever a dictionary is updated it may be dated as shown in the version column 332 of the dictionary module table 326.

The dictionary module table 326 is shown by way of example to include a word column/attribute 328, a database value column/attribute 330, and a version column/attribute 332. The dictionary module table 326 may track software changes at the network-based commerce system 12. Accordingly, using the dictionary module table 326 differences between a version of a schema definition resident on a third-party system 122 and on a network-based commerce system 12 may be determined or identified. In one embodiment, any additional language terms, definitions or the like are communicated as CustomCode or a reserved element.

It will be appreciated that further definition elements may be added to the schema definition 270 at the server system 125. For example, a further payment type "Discover" may be added (not shown) to the definitions 286. Thus, in the given example, the definitions would comprise Visa 288, Mastercard 290, Amex 292 and Discover (not shown). Assuming that both Amex 290 and were added to the schema definition 270, the version number of the schema definition 280 at the client application 122 may only accommodate three payment methods (Visa 288, Mastercard 290, and Custom slot or CustomCode 288). In these circumstances, the transform module 131 may transform a response from the database 130 using the current version of the schema definition 280 (Visa 288, Mastercard 290, Amex 292 and Discover) as Visa 288, Mastercard 290, CustomCode, and CustomCode. Thus using a predefined slot included in the schema definition when created, subsequent changes to the schema definition may not render a client application 124 inoperable due to the changes. It will be appreciated that a plurality or many custom slots 288 may be provided at different points in the structure of the schema definition 280.

In the exemplary network-based commerce facility 12, the data schema may also include other elements such as auction types, currency types, feedback types, country, and so on. It will be appreciated that the explanation above using payment types is merely an example of the use of a custom slot 288. It will be appreciated that a change in any element in a database schema may be accommodated by using the custom slot or CustomCode.

In an embodiment, the network-based commerce system 12 has a dictionary at the backend that lists well-defined languages which the network-based commerce facility 12 understands. For example, concepts supported by the network-based commerce facility may include payment terms, shipping services, currency, duration, auction type, display enhancements, and so on. These concepts may have a plurality of dictionary terms each relating to a concept. An example of dictionary terms associated with shipping services could be "UPS" and "USPS". The dictionary may be exact in that it defines United Parcel Service of America as "UPS" and not "United Parcel Service of America" and, likewise, the dictionary may define the United States Postal Services as "USPS" not "United States Postal Service". If, for example, FedEd was subsequently added to the schema definition at the server system 125, it would be categorized as CustomCode if the version of the schema definition at the client application 124 was created before its introduction.

Returning to FIG. 12, in an embodiment, assume word W1, represented by a database value "7", was added to the schema definitions on Jan. 1, 2004, W2, represented by a database value "9" was added to the schema definitions on Mar. 7, 2004, and W3, represented by a database value "3" was added to the schema definitions on Jan. 9, 2008. If the version of the schema definition on the client application 124 is dated prior to Jan. 1, 2004 then the system 125 would return a value corresponding to the CustomCode or default value when database values corresponding to words W1-W3 are returned from the database 130, if, however, the version of the schema definition on the client application 124 is dated prior to January Mar. 7, 2004 but after Jan. 1, 2004 then the system 125 would return the value "7" corresponding with W1 when it is returned from the database 130 but would return the CustomCode or default value when values "9" and "3" (corresponding to words W2 and W3) are returned from the database 130. Thus, in an embodiment, data returned from a database is transformed based on a dictionary resident at the client application. Accordingly, the client application can "understand" the response and thus process the response it receives even though the two schema definitions are different.

In an example embodiment, a mapping function may be performed by the transform module 131. For example, if word "W3" is not provided in the client definitions, then the transform module maps "W3" to the CustomCode or reserved element. This functionality may be applied in any environment which exposes a dictionary which defines a system, for example, any piece of software code having static data elements.

Thus, in an embodiment, one or more special reserved values or CustomCodes may be provided. When a server is out of sync with a client, the CustomCode or reserved value may be communicated to the client instead of a value that would be unknown to the client. For example, slots or values may be reserved for in an XML schema. The slots or values may be used to return schema object(s) which are not present on the client due to its outdated version, SOAP APIs work on objects based on input and output objects (and not XML) from end-client and server perspectives. The transport payload may still however be XML. The objects and the transport payload may be based on predefined XML schemas.

Figure 15:
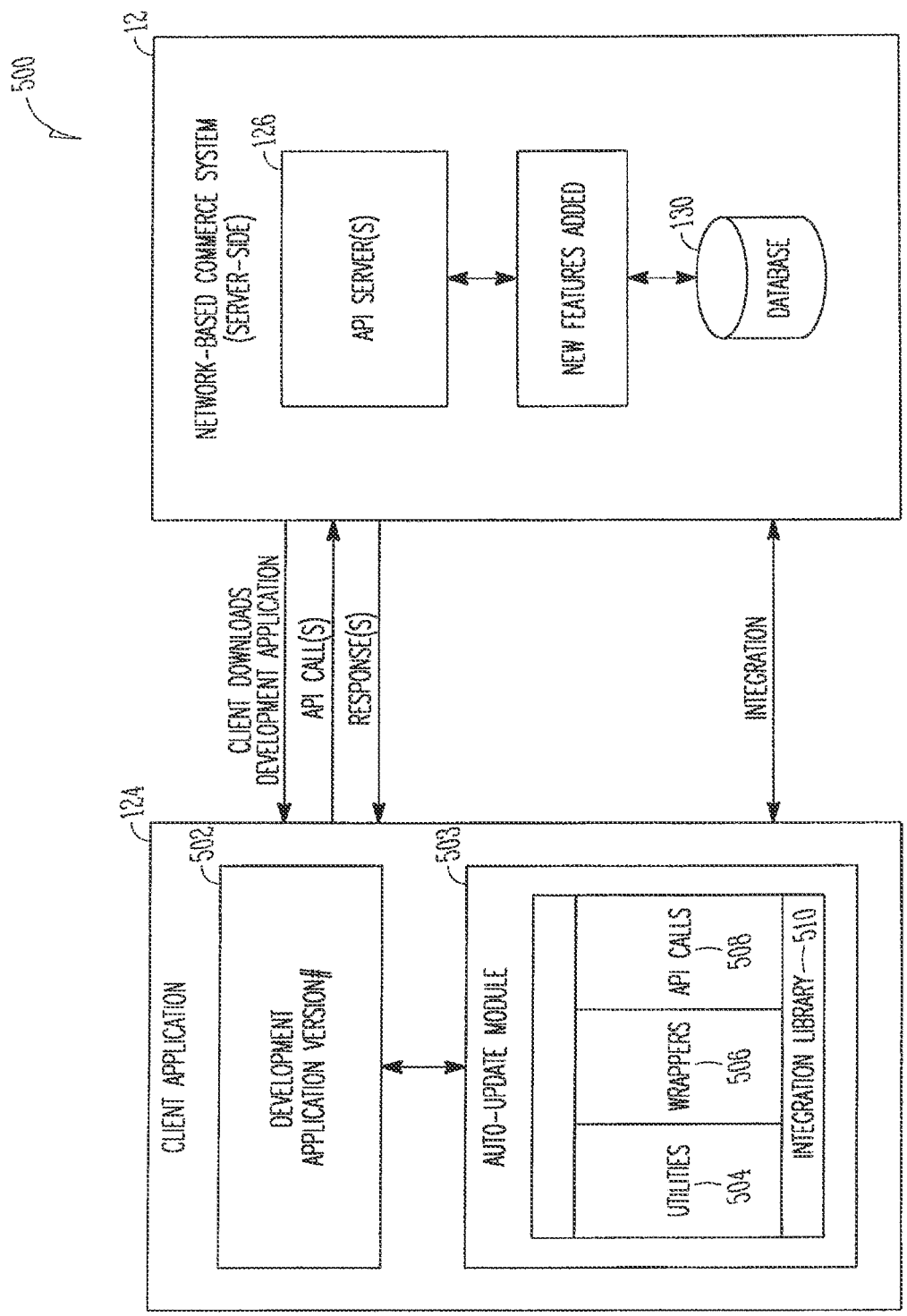
FIG. 15 is a schematic block diagram of a system, in accordance with an example embodiment of the invention, for automatically updating a client application.

Referring in particular to FIG. 15, reference 500 generally indicates a system, in accordance with an embodiment of the invention, for updating a development application 502 (e.g., a System Development Kit (SDK) at a client (e.g., a client application 124 at a third-party system 122). As described herein, a server-side application (e.g., API servers 126 at a network-based commerce system 12) may be modified, updated or the like which may thus render the client application 124 obsolete or out of date. In an embodiment of the invention, the client application 124 may be automatically updated by an auto-update module 503. The auto-update module 503 may automatically update utilities 504, wrappers 506 and API calls 508. An integration module 510 may integrate changes made a the network-based commerce system utilizing data in a database 130.

The development application 502 may be used by the third-party system 122 to gain programmatic access to server systems 125 of the network-based commerce facility 12. In an example auction environment, such development applications may allow a third-party to bulk upload auction listings, bulk delete auction listing, modify auction listing in a bulk-fashion, monitor the status of a plurality of listings and so on.

In one example embodiment, the development application 502 may communicate with the network-based commerce facility 12 using a business language. However, it will be appreciated that any programming language may be used. In one example mode of operation, the network-based commerce system 12 creates the development application 502 and, users or third-parties may download it. It will be appreciated that a third-party may download components of an application (e.g., a System Development Kit) that are then included or integrated within a client application 124. It will be appreciated that API servers 125 at the network-based commerce facility 12 may support client application that may be Java-based, desktop-based, or server-based applications resident on the third-party system 122.

As described above, when network-based commerce system 12 may (e.g., regularly) change features on its backend server(s), for example, on the API server(s) 126, such changes may be recorded. For example, a version number or identifier may be included in each revision or change. Examples of such features include new functionality within an action supported. For example, the network-based commerce system 12 may start to allow shipping to Canada and, accordingly, addition of an associated action may be required. The new action may, for example, be "create automatic shipping labels." It may not be practical to release anew version of the development application 502 each time new functionality is added to the server system 125.

In an embodiment, the development application 502 includes an API call component 508 (to make a call to the API server 126), wrappers 506, an integration library 510 which calls and docks to the database 130 at the network-based commerce system 12, and utilities 504. The utilities, in an embodiment, are basically useful functions that are written to combine various calls and other functions.

In an embodiment, the auto-update module 503 changes the calling mechanism and the integration library to support the latest features without having the network-based commerce system 12 to create a new version of the client application 124.

Figure 16:
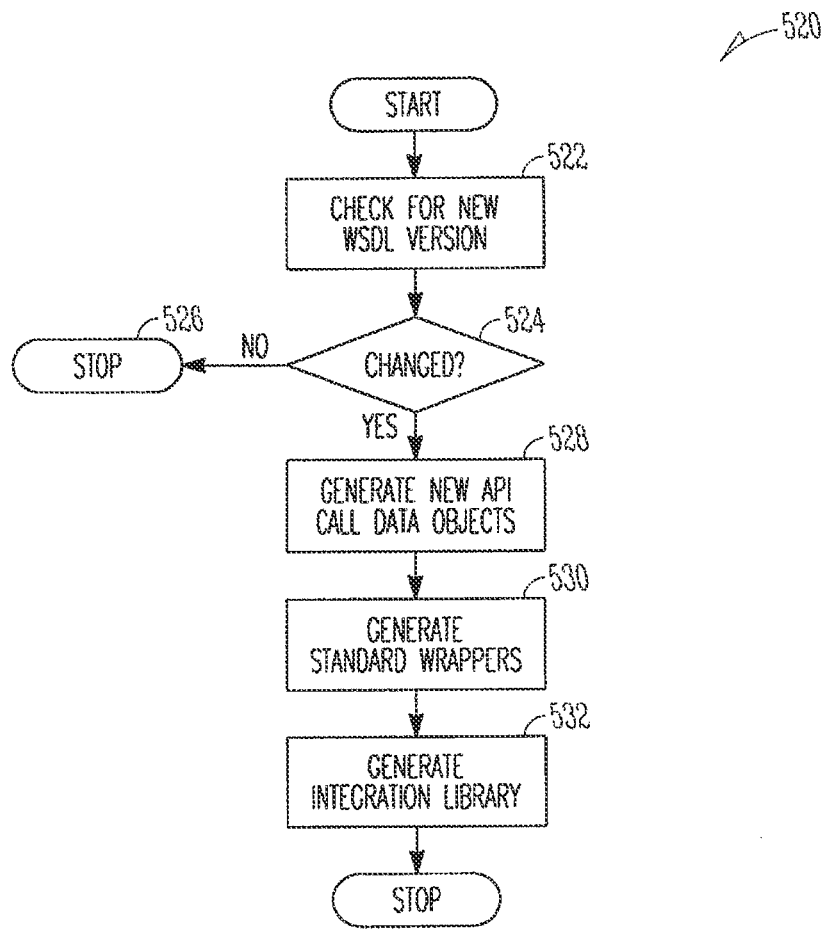
FIG. 16 is a schematic flow diagram of a method, in accordance with an example embodiment of the invention, for automatically updating a client application.

Referring to FIG. 16, reference 520 generally indicates a method, in accordance with an example embodiment of the invention, for updating a client application. As shown at block 522, the method 520 initially checks to see if a new version (e.g., a new WSDL version) is running at the server system 125. This may be accomplished by making a call to the network-based commerce system 12 and receiving a response indicating what the latest version at the server system 125 is. The version number may identify the version of a schema definition language. A check is then performed at decision block 524 to determine if the version number has changed. If the schema definition version has not changed, the method 520 stops as shown at 526. If, however, the schema definition version has changed, the network-based commerce system 12 will generate new API call data objects (see block 528), generate standard wrappers (see block 530), and generate an integration library (see block 532). The new objects may be new Java objects.

Figure 17:
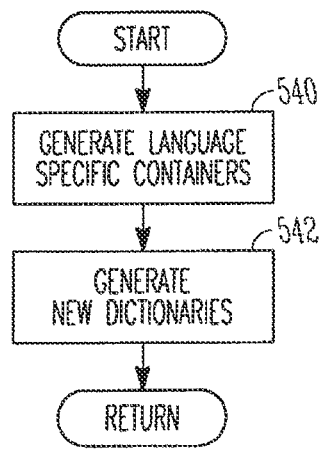
FIGS. 17-19 show examples of more detailed functionality performed by the method of FIG. 16.
Figure 18:
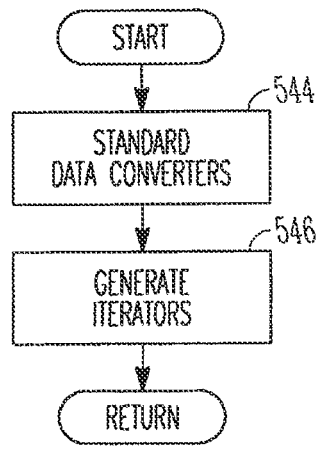

The generation of the new API call data objects (see block 528) may include generating language specific containers (see block 540 in FIG. 17) and generating new dictionaries (see block 542). The generation of the wrappers may comprise providing standard data converters (see block 544 in FIG. 18) and generating iterators (see block 546).

Figure 19:
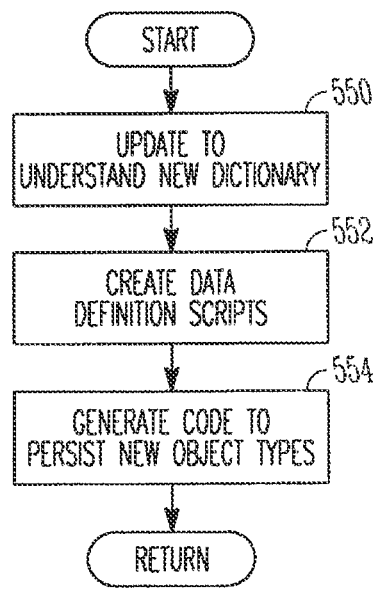

The generation of the integration library may include updating the integration library to understand any new dictionary terms (see block 550 in FIG. 19) that have been defined at the server system 125. Definition scripts are then created at block 552. Following on the example above, scripts may be created for the new shipping option to Canada. Thereafter, as shown at block 554, code is generated to persist the new object types.

Figure 14:
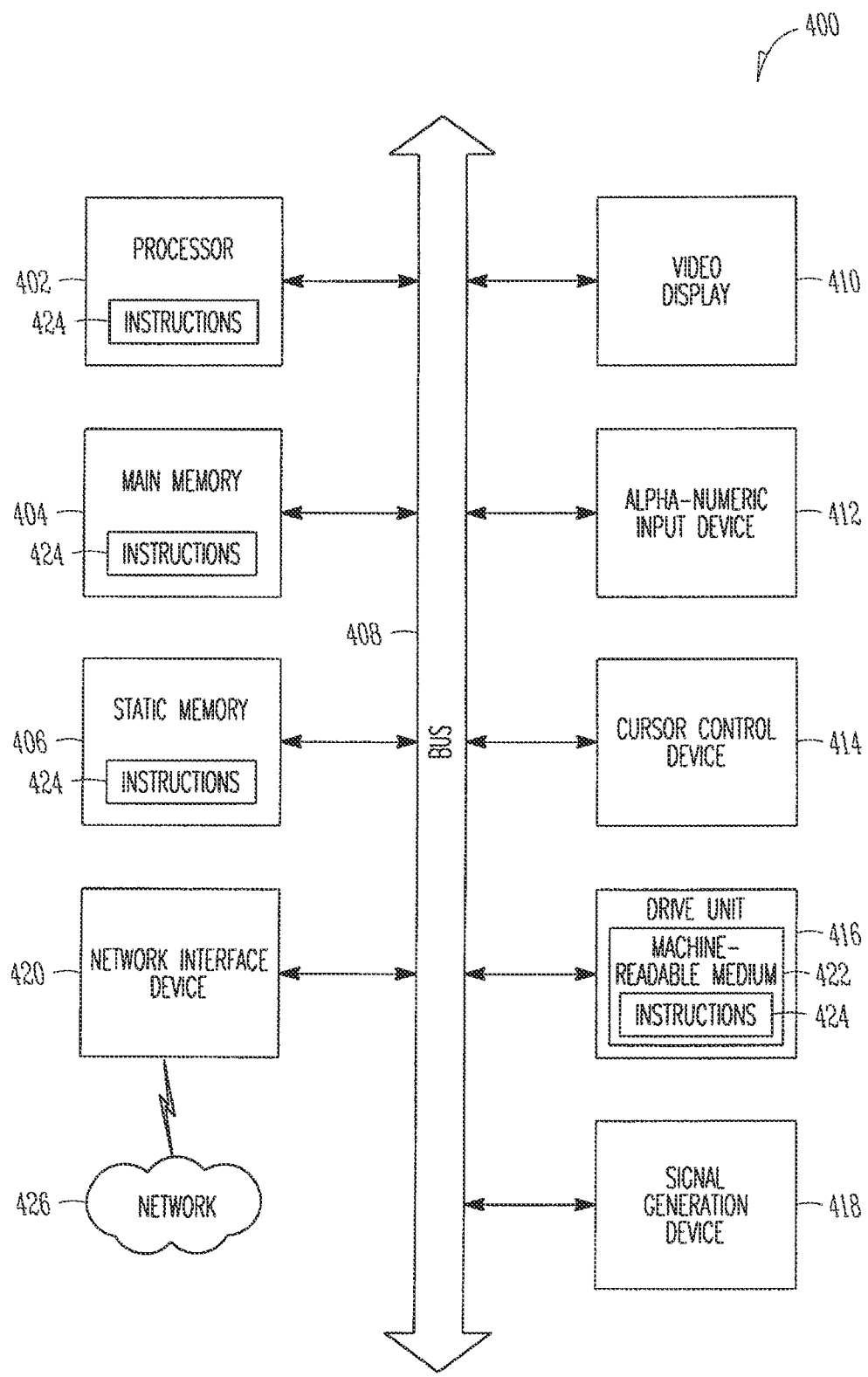
FIG. 14 is a block diagram representation of a machine, in the example form of a computer system, within which a set of instructions for causing the machine to perform any one or more of the methodologies discussed herein may be executed.

FIG. 14 shows a diagrammatic representation of machine in the example form of a computer system 100 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, white only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU) a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software 424) embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shah also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
receiving a request generated by a first application program using a first database schema, the request including a first version identifier identifying the first database schema, the request being received at a second application program using a second database schema;
determining the first version identifier is different than a second version identifier corresponding to the second database schema;
generating, using a processor, a response including a reserved element that corresponds to a custom slot provided in the first database schema, the reserved element being an indication that at least one new schema definition element is included in the second database schema and the at least one new schema is not recognizable by the first application program; and
communicating the response to the first application program.

2. The method of claim 1, wherein the first database schema is a client-side database schema and the first application program is a client application, and the second database schema is a server-side database schema and the second application program is a server application.

3. The method of claim 1, wherein the custom slot is included in the first database schema upon creating the second database schema.

4. The method of claim 1, wherein the at least one new schema definition element is an XML schema definition and the custom slot is provided in a schema dictionary.

5. The method of claim 1, wherein the second database schema is a later version of the first database schema.

6. The method of claim 5, further comprising determining the second database schema contains an element not found in the first database schema.

7. The method of claim 1, wherein the response is generated in response to a request from the second application program.

8. The method of claim 1, wherein the at least one new schema definition element is unrecognizable to the first application program using the first database schema because the value is not included in the first database schema.

9. The method of claim 1, wherein the first application program is a client application, and the first database schema is a client-side database, the second application program is an Application Program Interface (API), the second database schema is a server-side database schema.

10. A system comprising:
one or more processors to execute at least one processing module, the at least one processing module configured to:
receive a request generated by a first application program using a first database schema, the request including a first version identifier identifying the first database schema, the request being received at a second application program using a second database schema;
determine the first version identifier is different than a second version identifier corresponding to the second database schema;
generate a response including a reserved element that corresponds to a custom slot provided in the first database schema, the reserved element being an indication that at least one new schema definition element is included in the second database schema and the at least one new schema is not recognizable by the first application program; and
communicate the response to the first application program.

11. The system of claim 10, wherein the request and the response are communicated using Web Services Description Language (WSDL) messages.

12. The system of claim 10, wherein the custom slot is included in the first database schema upon creating the first database schema.

13. The system of claim 10, wherein the first database schema is a client-side database schema and the first application program is a client application, and the second database schema is a server-side database schema and the second application program is a server application.

14. The system of claim 10, wherein the second database schema is a later version of the first database schema.

15. The system of claim 14, wherein the processing module is to determine whether the first database schema has been altered.

16. The system of claim 10, wherein the response is generated in response to the request from the first application program.

17. The system of claim 10, wherein the at least one new schema definition element is unrecognizable to the first application program using the first database schema because the at least one new schema definition element is not included in the first database schema.

18. The system of claim 10, wherein the first application program is a client application, and the first database schema is a client-side database, the second application program is an Application Program Interface (API), the second database schema is a server-side database schema.

19. A non-transitory machine-readable storage device storing instructions which, when executed by a machine, cause the machine to perform operations comprising:
receiving a request generated by a first application program using a first database schema, the request including a first version identifier identifying the first database schema, the request being received at a second application program using a second database schema;

determining the first version identifier is different than a second version identifier corresponding to the second database schema;

generating, using a processor, a response including a reserved element that corresponds to a custom slot provided in the first database schema, the reserved element being an indication that at least one new schema definition element is included in the second database schema and the at least one new schema is not recognizable by the first application program; and communicating the response to the first application program.

20. The machine-readable storage device of claim 19, wherein the second database schema is a later version of the first database schema.

\* \* \* \* \*